United States Patent
Kataoka et al.

(10) Patent No.: US 9,381,961 B1
(45) Date of Patent: Jul. 5, 2016

(54) ROBOTIC SYSTEMS HAVING PROTRUSIONS FOR USE IN STARTING POSITIONS AND IN USE POSITIONS

(71) Applicant: Google Inc., Mountain View, CA (US)

(72) Inventors: Satoshi Kataoka, Tokyo (JP); Yuto Nakanishi, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/582,130

(22) Filed: Dec. 23, 2014

Related U.S. Application Data

(60) Provisional application No. 62/046,158, filed on Sep. 4, 2014.

(51) Int. Cl.
*B62D 57/02* (2006.01)
*B25J 9/00* (2006.01)
*B25J 5/00* (2006.01)

(52) U.S. Cl.
CPC . *B62D 57/02* (2013.01); *B25J 5/00* (2013.01); *B25J 9/0006* (2013.01); *Y10S 901/01* (2013.01)

(58) Field of Classification Search
CPC .............. B25J 3/00; B25J 9/00; B25J 9/0003; B25J 9/0006; B25J 9/1694; B25J 11/002; B25J 11/0025; B25J 5/00; B62D 57/02; G05B 19/10; Y10S 901/01; Y10S 901/49
See application file for complete search history.

(56) References Cited

U.S. PATENT DOCUMENTS

| | | | | |
|---|---|---|---|---|
| 4,662,465 A * | 5/1987 | Stewart | ................. | B62D 57/02 180/8.1 |
| 5,369,346 A * | 11/1994 | Takahashi | ............ | B62D 57/032 180/8.1 |
| 5,739,655 A | 4/1998 | Torii et al. | | |
| 6,278,903 B1 * | 8/2001 | Iwasaki | ................... | B08B 9/055 165/11.2 |
| 6,377,014 B1 | 4/2002 | Gomi et al. | | |
| 6,583,595 B1 * | 6/2003 | Hattori | ................ | B62D 57/032 318/567 |
| 7,059,182 B1 * | 6/2006 | Ragner | ................ | H05K 5/0086 73/200 |
| 7,249,640 B2 | 7/2007 | Horchler et al. | | |
| 7,327,112 B1 * | 2/2008 | Hlynka | ................ | B25J 19/0091 318/568.12 |
| 7,847,504 B2 | 12/2010 | Hollis | | |
| 2004/0167641 A1 * | 8/2004 | Kawai | ................. | A61B 5/1038 700/63 |
| 2006/0090938 A1 * | 5/2006 | Tanielian | ............... | B62D 57/00 180/8.1 |
| 2010/0057253 A1 * | 3/2010 | Kwon | ................. | B25J 19/0091 700/245 |
| 2013/0060383 A1 * | 3/2013 | Jeong | ....................... | B25J 9/045 700/261 |
| 2013/0282174 A1 | 10/2013 | Xi et al. | | |

* cited by examiner

*Primary Examiner* — Jerrah Edwards
*Assistant Examiner* — Tamara Weber
(74) *Attorney, Agent, or Firm* — McDonnell, Boehnen, Hulbert & Berghoff LLP

(57) ABSTRACT

Disclosed are robotic systems, methods, bipedal robot devices, and computer-readable mediums. For example, a robotic system may include a robotic body having an axis; a sensor connected to the robotic body, where the sensor is configured to receive information within a scanning area; two or more robotic legs connected to the robotic body, where the two or more robotic legs are configured to operate in a starting position and a use position, where in the starting position the robotic system is substantially stationary; and one or more protrusions connected to the robotic body, where the one or more protrusions extend from the robotic body at a non-perpendicular angle from the axis of the robotic body and are located outside of the scanning area of the sensor, and where in the starting position the one or more protrusions are configured to support the robotic system.

19 Claims, 24 Drawing Sheets

ROBOTIC SYSTEMS HAVING PROTRUSIONS FOR USE IN STARTING POSITIONS AND IN USE POSITIONS

CROSS-REFERENCE TO RELATED APPLICATION

The present application claims the benefit of U.S. Provisional Application No. 62/046,158, filed Sep. 4, 2014. The entire disclosure contents of this application are herewith incorporated by reference into the present application.

BACKGROUND

One type of a robotic system may be a humanoid robot. These robotic systems may have a structure that resembles a human body. One example robotic system may have a robotic head, two robotic arms, a main robotic body, and two robotic legs. The robotic system may stand with the two robotic legs. For example, each of the robotic legs may include a robotic knee, a robotic ankle, and a robotic foot. As such, the robotic system may stand with the robotic legs to stabilize the robotic system. For instance, the two robotic legs may bear the weight of the robotic system while balancing the robotic system's full body dynamics.

SUMMARY

An example robotic system may include a robotic body, robotic legs connected to the robotic body, and protrusions connected to the robotic body. The robotic legs may be configured to operate in certain positions. And the protrusions may be configured to support the robotic system in one position and receive an external force in another position when the robotic system falls over, crashes, or otherwise fails. As such, example implementations herein disclose robotic systems, computer-readable mediums, and methods to implement protrusions that may be used be support to the robotic system and/or receive an external force.

In one implementation, a robotic system is disclosed. The robotic system may include a robotic body having an axis. Further, the robotic system may include a sensor connected to the robotic body. The sensor may be configured to receive information within a scanning area. Yet further, the robotic system may include two or more robotic legs connected to the robotic body. The two or more robotic legs may be configured to operate in a starting position and a use position, where in the starting position the robotic system may be substantially stationary, and where in the use position the two or more robotic legs may be configured to move the robotic system in a direction substantially perpendicular to the axis of the robotic body. Yet further, the robotic system may include one or more protrusions connected to the robotic body. The one or more protrusions may extend from the robotic body at a non-perpendicular angle from the axis of the robotic body and may be located outside of the scanning area of the sensor. In the starting position, the one or more protrusions may be configured to support the robotic system.

In another implementation, a robotic system is disclosed. The robotic system may include one or more processors. Further, the robotic system may include a robotic body having an axis. Yet further, the robotic system may include a sensor connected to the robotic body. The sensor may be configured to receive information within a scanning area. Yet further, the robotic system may include two or more robotic legs connected to the robotic body. The two or more robotic legs may be configured to operate in a starting position and a use position, where in the starting position the robotic system may be substantially stationary, and where in the use position the two or more robotic legs may be configured to move the robotic system in a direction substantially perpendicular to the axis of the robotic body. Yet further, the robotic system may include one or more protrusions connected to the robotic body. The one or more protrusions may extend from the robotic body at a non-perpendicular angle from the axis and may be located outside of the scanning area of the sensor. In the starting position the one or more protrusions may be configured to support the robotic system. Yet further, the robotic system may include a computer-readable medium having stored thereon program instructions that, when executed by the one or more processors, cause the robotic system to perform operations. The operations may include determining the robotic system is in the use position. Further, the operations may include in response to the determination that the robotic system is in the use position, causing retraction of at least one protrusion of the one or more protrusions at a first time period. Yet further, the operations may include determining an emergency event. Yet further, the operations may include in response to the determination of the emergency event, causing deployment of the at least one protrusion at a second time period.

In another aspect, a method is disclosed. The method may involve determining a robotic system is in a use position. The robotic system may include a robotic body having an axis, two or more robotic legs connected to the robotic body, and one or more protrusions connected to the robotic body, where in the use position the two or more robotic legs are configured to move the robotic system in a direction substantially perpendicular to the axis of the robotic body, and where the one or more protrusions may extend from the robotic body at a non-perpendicular angle from the axis of the robotic body. The method may involve in response to determining the robotic system is the use position, causing retraction of at least one protrusion of the one or more protrusions at a first time period. The method may involve determining an emergency event. And the method may involve in response to determining the emergency event, causing deployment of the at least one protrusion at a second time period.

In another aspect, a system is disclosed. The system may include means for determining a robotic system is in a use position. The robotic system may include a robotic body having an axis, two or more robotic legs connected to the robotic body, and one or more protrusions connected to the robotic body, where in the use position the two or more robotic legs are configured to move the robotic system in a direction substantially perpendicular to the axis of the robotic body, and where the one or more protrusions may extend from the robotic body at a non-perpendicular angle from the axis of the robotic body. Further, the system may include means for in response to determining the robotic system is the use position, causing retraction of at least one protrusion of the one or more protrusions at a first time period. Further still, the system may include means for determining an emergency event. And the system may include means for in response to determining the emergency event, causing deployment of the at least one protrusion at a second time period.

In another aspect, a system is disclosed. The system may include means for determining an emergency event of a robotic system. The robotic system may include a robotic body having an axis, two or more robotic legs connected to the robotic body, and one or more protrusions connected to the robotic body, where in the use position the two or more robotic legs are configured to move the robotic system in a direction substantially perpendicular to the axis of the robotic body, and where the one or more protrusions may extend from the robotic body at a non-perpendicular angle from the axis of the robotic body. Further, the system may include means for in response to determining the emergency event of the robotic system, causing deployment of at least one protrusion of the one or more protrusions.

In another aspect, a method is disclosed. The method may involve determining an emergency event of a robotic system. The robotic system may include a robotic body having an axis, two or more robotic legs connected to the robotic body, and one or more protrusions connected to the robotic body, where in the use position the two or more robotic legs are configured to move the robotic system in a direction substantially perpendicular to the axis of the robotic body, and where the one or more protrusions may extend from the robotic body at a non-perpendicular angle from the axis of the robotic body. And the method may involve in response to determining the emergency event of the robotic system, causing deployment of at least one protrusion of the one or more protrusions.

In another aspect, a method is disclosed. The method may involve determining a robotic system is in a use position. The robotic system may include a robotic body having an axis, two or more robotic legs connected to the robotic body, and one or more protrusions connected to the robotic body, where in the use position the two or more robotic legs are configured to move the robotic system in a direction substantially perpendicular to the axis of the robotic body, and where the one or more protrusions may extend from the robotic body at a non-perpendicular angle from the axis of the robotic body. And the method may involve in response to determining the robotic system is in the use position, causing refraction of at least one protrusion of the one or more protrusions.

In another aspect, a system is disclosed. The system may include means for determining a robotic system is in a use position. The robotic system may include a robotic body having an axis, two or more robotic legs connected to the robotic body, and one or more protrusions connected to the robotic body, where in the use position the two or more robotic legs are configured to move the robotic system in a direction substantially perpendicular to the axis of the robotic body, and where the one or more protrusions may extend from the robotic body at a non-perpendicular angle from the axis of the robotic body. And the system may include means for in response to determining the robotic system is in the use position, causing retraction of at least one protrusion of the one or more protrusions.

In another implementation, a robotic system is disclosed. The robotic system may include a robotic body having an axis. Further, the robotic system may include a sensor connected to the robotic body. The sensor may be configured to receive information within a scanning area. Yet further, the robotic system may include two or more robotic legs connected to the robotic body. Yet further, the robotic system may include one or more air bags connected to the robotic body. The one or more air bags may be located outside of the scanning area of the sensor and may be configured to receive an external force.

In another implementation, a robotic system is disclosed. The robotic system may include one or more processors. Further, the robotic system may include a robotic body having an axis. Yet further, the robotic system may include a sensor connected to the robotic body. The sensor may be configured to receive information within a scanning area. Yet further, the robotic system may include two or more robotic legs connected to the robotic body. Yet further, the robotic system may include one or more air bags connected to the robotic body. The one or more air bags may be located outside of the scanning area of the sensor. Yet further, the robotic system may include a computer-readable medium having stored thereon program instructions that, when executed by the one or more processors, cause the robotic system to perform operations. The operations may include determining an emergency event. Yet further, the operations may include in response to the determination of the emergency event, causing deployment of at least one air bag of the one or more air bags.

In another implementation, a method is disclosed. The method may involve determining an emergency event of a robotic system. The robotic system may include a robotic body having an axis, two or more robotic legs connected to the robotic body, and one or more air bags connected to the robotic body. And the method may involve in response to determining the emergency event, causing deployment of at least one air bag of the one or more air bags.

In another implementation, a system is disclosed. The system may include means for determining an emergency event of a robotic system. The robotic system may include a robotic body having an axis, two or more robotic legs connected to the robotic body, and one or more air bags connected to the robotic body. Further, the system may include means for in response to determining an emergency event, causing deployment of at least one air bag of the one or more air bags.

These as well as other implementations, aspects, advantages, and alternatives will become apparent to those of ordinary skill in the art by reading the following detailed description, with reference where appropriate to the accompanying drawings. Further, this summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

DETAILED DESCRIPTION

Figure 1:
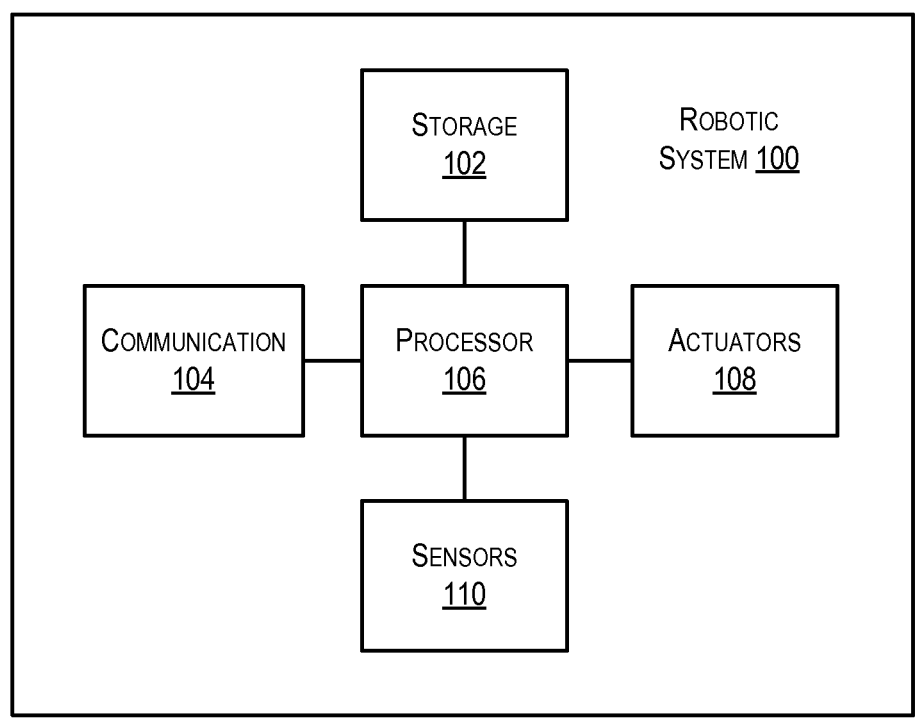
FIG. 1 depicts aspects of a robotic system, according to an example implementation.

Example systems, methods, devices, and computer-readable mediums are described herein. It should be understood that the words "example" and "exemplary" are used herein to mean "serving as an example, instance, or illustration." Any implementation or feature described herein as being an "example" or "exemplary" is not necessarily to be construed as preferred or advantageous over other implementations or features. Other implementations can be utilized, and other changes can be made, without departing from the scope of the subject matter presented herein.

Thus, the example implementations described herein are not meant to be limiting. The aspects of the present disclosure, as generally described herein, and illustrated in the figures, can be arranged, substituted, combined, separated, and designed in a wide variety of different configurations, all of which are explicitly contemplated herein.

I. Overview

A robotic system may be a humanoid robot with two robotic legs that bear the weight of the robotic system. For example, the weight of the robotic system may rest on each of the robotic legs while the robotic system is in a standing position. As such, approximately half of the weight may be placed on one robotic foot and the other approximate half of the weight may be placed on the other robotic foot.

In an illustrative embodiment, a robotic system may include a robotic body having an axis, a sensor connected to the robotic body, robotic legs connected to the robotic body, and protrusions connected to the robotic body. The sensor may be configured to receive information within a scanning area. The robotic legs may be configured to operate in a starting position and a use position. In the starting position, the robotic system may be substantially stationary. And in the use position, the robotic legs may be configured to move the robotic system in a direction substantially perpendicular to the axis of the robotic body.

The protrusions may extend from the robotic body at a non-perpendicular angle from the axis of the robotic body and may be located outside of the scanning area of the sensor. Further, the protrusions may be configured to support the robotic system in the starting position. With this arrangement, the protrusions may bear the weight of the robotic system rather than the robotic legs. Beneficially, in the starting position, the protrusions may help to improve stability of the robotic system and/or conserve energy of the robotic system.

In some implementations, the protrusions may be configured to receive an external force in the use position, such as a shock impact when the robotic system falls over, crashes, or otherwise fails. With this arrangement, the protrusions may absorb at least some of the external force rather than the robotic body or the robotic legs. Beneficially, in the use position, the protrusions may help to reduce mechanical damage to the robotic body and/or the robotic legs.

Further, in some implementations, the protrusions may be configured to retract. For instance, the robotic system may make a determination that the robotic system is in the use position and in response to the determination that the robotic system is in the use position, the robotic system may retract the protrusions. Further still, in some implementations, the protrusions may be configured to deploy. For instance, the robotic system may make a determination of an emergency event and in response to the determination of the emergency event, the robotic system may deploy the protrusions.

In an illustrative embodiment, a robotic system may include a robotic body having an axis, a sensor connected to the robotic body, robotic legs connected to the robotic body, and air bags connected to the robotic body. The sensor may be configured to receive information within a scanning area.

The air bags may be located outside of the scanning area of the sensor. Further, the air bags may be configured to receive an external force, such as a shock impact when the robotic system falls over, crashes, or otherwise fails. With this arrangement, the air bags may absorb at least some of the external force rather than the robotic body or the robotic legs. Beneficially, the air bags may help to reduce mechanical damage to the robotic body and/or the robotic legs. Further, in some implementations, the air bags may be configured to deploy. For instance, the robotic system may make a determination of an emergency event and in response to the determination of the emergency event, the robotic system may deploy the air bags.

Beneficially, the embodiments described herein may be used when testing the robotic system and/or when the robotic system operates in an environment, such as an environment involving a manufacturing facility.

II. Example Robotic Systems

FIG. 1 depicts aspects of a robotic system, according to an example implementation. In some examples, robotic system 100 may include computer hardware, such as a storage 102, a communication component 104, a processor 106, actuators 108, and sensors 110. For example, one or more of these hardware components may be designed for a robotic system 100 such as a humanoid robot and/or a bipedal-robot device.

Storage 102 may be a memory that includes a non-transitory computer-readable medium having stored thereon program instructions. The processor 106 may be coupled to the storage 102 to cause the robotic system 100 to perform operations based on executing these program instructions. Further, the processor 106 may be coupled to the communication component 104 for communicating with other robotic systems, robots, and/or devices. For example, communication component 104 may be used to access one or more server devices of a network. In some implementations, communication component 104 may include a wired connection including, for example, a parallel bus or a serial bus such as a Universal Serial Bus (USB). Further, communication component 104 may include a wireless connection including, for example, Bluetooth, IEEE 802.11, Cellular (such as GSM, CDMA, UMTS, EV-DO, WiMAX, or LTE), or Zigbee, among other possibilities.

Processor 106 may store, in the storage 102, data obtained from the sensors 110. In some examples, sensors 110 may include a gyroscope, an accelerometer, a Doppler sensor, a sonar sensor, a radar device, a laser-displacement sensor, and/or a compass, possibly to measure locations and/or movements of the robotic system 100. Yet further, sensors 110 may include an infrared sensor, an optical sensor, a light sensor, a camera, a biosensor, a capacitive sensor, a touch sensor, a temperature sensor, a wireless sensor, a radio sensor, a sound sensor, and/or a smoke sensor, possibly to obtain data indicative of an environment of the robotic system 100. In addition, sensors 110 may include a sensor that measure forces acting about the robotic system 100. For example, sensors 110 may include a sensor that measures forces (e.g., inertial forces and/or gravitational forces (possibly referred to herein as "G-forces")) in multiple dimensions. Further, sensors 110 may include a sensor that measures torque (possibly referred to herein as a "force-torque sensor"), a sensor that measures ground forces (possibly referred to a "ground force sensor" and/or a "friction sensor"), and a zero moment point (ZMP) sensor that identifies ZMPs and/or locations of the ZMPs, among other possibilities. A ZMP may be located in a robotic foot where a sum of all forces acting on that point in the robotic foot may equal approximately zero.

The robotic system 100 may also have actuators 108 that enable the robotic system 100 to initiate movements. For example, the actuators 108 may include or be incorporated with robotic joints connecting robotic limbs to a robotic body. For example, the actuators 108 may include robotic hip joints connecting robotic legs to the robotic body. Further, the actuators 108 may include robotic knee joints connecting parts (e.g., robotic thighs and robotic calves) of the robotic legs. Yet further, the actuators 108 may include robotic ankle joints connecting the robotic legs to robotic feet. In addition, the actuators 108 may include motors for moving the robotic limbs. As such, the actuators 108 may enable the mobility of the robotic system 100 in an environment of the robotic system 100.

The robotic system 100 may include one or more direct current (DC) motors, permanent magnet motors, fuel powered motors (e.g., gasoline and/or gas powered motors), and/or servo motors to move the robotic limbs. Such motors may allow the robotic system 100 to have precise control of its actuators 108 and the movement of the robotic limbs. Yet, such motors may also be heavy, thereby causing the robotic system 100 to consume more power to move robotic limbs. Further, the weight of the motors may cause the robotic legs to make heavy impacts with the ground, possibly damaging the robotic legs over time and/or after traveling long distances. In some implementations, the robotic system 100 may include hydraulic mechanisms to move the robotic limbs. The hydraulic systems may give the robotic system 100 more strength, enabling the robotic system 100 to lift heavy objects. Yet, the hydraulic mechanisms may require pumps that may be bulky, taking up additional space in the robotic system. In addition, the hydraulic mechanisms may be difficult to control such that the robotic movements may appear spastic, jerky, and/or less precise.

Thus, the robotic system 100 may include smaller and/or lightweight motors to move the robotic limbs. Yet, such motors may encounter challenges as well. For example, the actuators 108 with smaller motors may deliver a limited amount of power. Thus, decreasing the size of motors may cause the robotic system 100 to be weaker. Further, driving the motors at higher speeds may cause the motors to emanate thermal energy, possibly overheating the robotic system. Yet further, it may be difficult to determine the internal temperature of the motors to prevent the robotic system from overheating.

Figure 2:
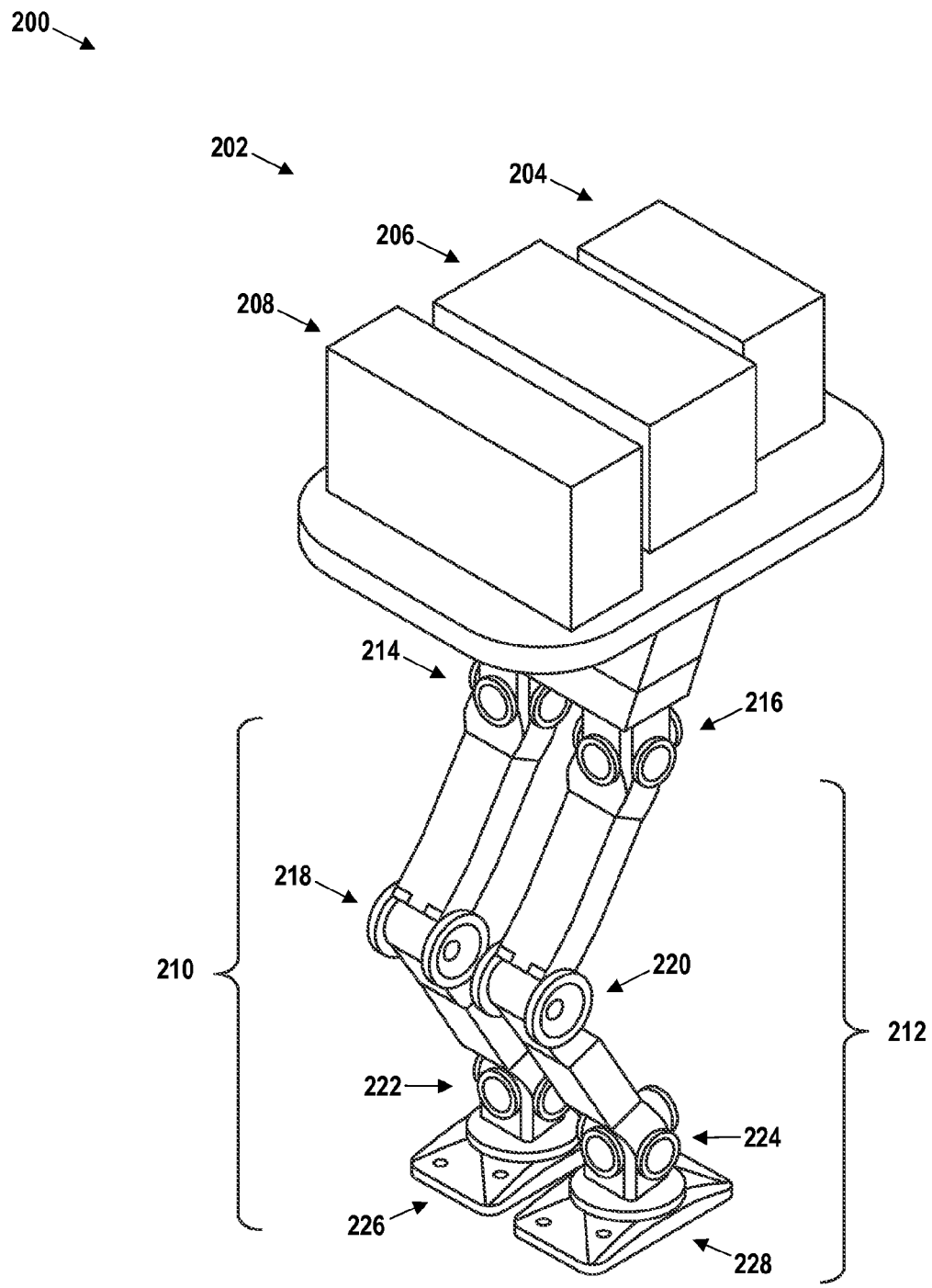
FIG. 2 depicts aspects of a robotic system, according to an example implementation.

FIG. 2 depicts aspects of a robotic system, according to an example implementation. The robotic system 200 may include, for example, one or more parts of the robotic system 100 in relation to FIG. 1. For example, the robotic legs 210 and 212 may include sensors 110, such as sensors that measure inertial forces and/or G-forces in multiple dimensions, a force-torque sensor, a ground force sensor, a friction sensor, and/or a ZMP sensor, among other possibilities.

As shown, a robotic body 202 may include a battery 204, a radiator 206, and a capacitor 208. The robotic system 200 may also include two robotic hips 214 and 216, connecting the robotic body 202 to the two robotic legs 210 and 212, respectively. Further, the two robotic legs 210 and 212 may include two robotic knee joints 218 and 220, two robotic ankle joints 222 and 224, and two robotic feet 226 and 228, respectively. The robotic system 200 may weigh approximately 30 to 80 kilograms.

Battery 204 may be used to power the robotic system 200. Radiator 206 may transfer thermal energy from one part of the robotic system 200 to another for cooling the robotic system 200. The radiator 206 may provide liquids to cool the motors in the robotic system 200. Capacitor 208 may be a multi-layered capacitor (e.g., a double-layered capacitor) operable to produce current in a shortened period of time. The capacitor 208 may produce currents to power the motors when the available power capacity in the capacitor 208 is lower than one or more capacity thresholds. For example, the capacitor 208 may supply varying amounts of current to motors and drivers in the robotic legs 210 and 212, possibly more reliably than the battery 204. In some instances, the capacitor 208 may operate with an approximate voltage of 50-150 volts (V), an approximate capacitance of 7-21 farads, and an approximate internal resistance of 25-150 miliohms (m$\Omega$).

The robotic system 200 may include one or more motors powered by the capacitor 208. For example, the robotic system 200 may include one or more of the motors that generate heat and are cooled by lower temperature liquids around the motors. For example, the robotic knee joints 218 and 220 may include motors cooled by liquids to achieve rotational speeds over approximately 1,000-2,000 degrees per second and over approximately 350-700 newton meters (Nm) of torque.

Further, the motors cooled by liquids may be used to move robotic hips 214 and 216. Additionally, these motors may be used to move the robotic legs 210 and 212. In particular, these motors may be positioned in the robotic knee joints 218 and 220, and the robotic ankle joints 222 and 224. As such, the robotic system 200 may engage in bipedal walking, possibly resembling the walking patterns of a human person. The weight of the robotic system 200 may shift on to each of the robotic legs 210 and 212 interchangeably. In particular, the robotic system 200 may shift the weight on to the robotic foot 226 as the robotic leg 212 swings forward to take a step. Further, the robotic system 200 may shift the weight on to the robotic foot 228 as the robotic leg 210 swings forward to take a step.

The robotic system 200 may be operable through remote controls. Yet, the robotic system 200 may also be operable autonomously. For example, the robotic system 200 may include control algorithms that maintain the stability and balance of the robotic system 200. These algorithms may implement a push-recovery capability such that the robotic system 200 may maintain its balance after a force is applied to the robotic system 200. This capability may cause the robotic system 100 to reposition the robotic legs 210 and 212, and the robotic feet 226 and 228. For instance, the robotic system 200 may maintain balance on the robotic legs 210 and 212, and the robotic feet 226 and 228 after being hit, kicked, and/or shoved. The robotic system 200 may be capable of computing approximately 70 to 270 placements of the robotic legs 210 and 212, and the robotic feet 226 and 228 in less than approximately 0.1-1 milliseconds.

Figure 3:
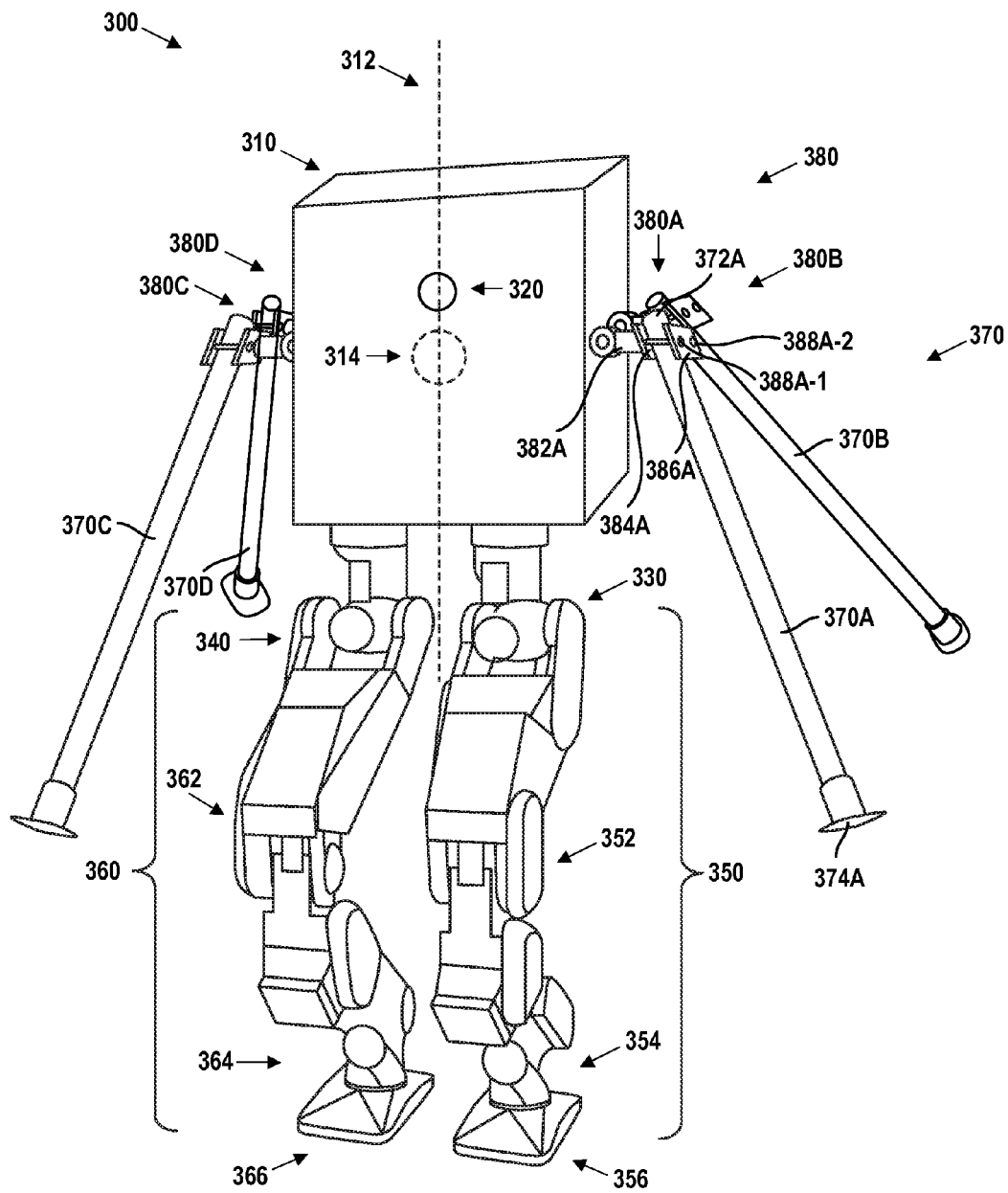
FIG. 3 depicts aspects of a robotic system, according to an example implementation.

FIG. 3 depicts aspects of a robotic system, according to an example implementation. The robotic system 300 may include, for example, one or more parts of the robotic systems described above in relation to FIGS. 1 and 2. For example, robotic legs 350 and 360 may include actuators 108 and sensors 110 such as a sensor that measures inertial forces and or G-forces in multiple dimensions, a force-torque sensor, a ground force sensor, a friction sensor, and/or a ZMP sensor, among other possibilities. Further, the robotic system 300 may include one or more motors that generate heat and are cooled by lower temperature liquids around the motors. As such, the robotic system 300 may engage in bipedal walking.

The robotic system 300 may include a robotic body 310, a sensor 320 connected to the robotic body 310, two robotic hips 330 and 340 connecting the robotic body 310 to the two robotic legs 350 and 360, one or more protrusions 370, and one or more connectors 380. The robotic body 310 may include an axis 312 and may have a center of mass 314. Further, the two robotic legs 350 and 360 may include two robotic knee joints 352 and 362, two robotic ankles 354 and 364, and two robotic feet 356 and 366, respectively. The robotic system 300 may weigh approximately 60 to 100 kilograms.

The two robotic legs 350 and 360 may be configured to operate in a starting position and a use position. In the starting position, the robotic system 300 may be substantially stationary. For instance, the robotic system 300 may be stationary or a deviation from stationary that does not cause the robotic system 300 to operate in a significantly different manner from when the robotic system 300 is stationary. In some implementations, in the starting position, the actuators 108 of the robotic system 300 may be in a fixed position.

In the use position, the two robotic legs 350 and 360 may be configured to move the robotic system 300 in a direction substantially perpendicular to the axis 312 of the robotic body 310. For instance, the two robotic legs 350 and 360 may be configured to move the robotic system 300 in a direction perpendicular to the axis 312 of the robotic body 310 or a deviation from perpendicular that does not cause the robotic system 300 to operate in a significantly different manner from when the two robotic legs 350 and 360 move the robotic system 300 in a direction perpendicular to the axis 312 of the robotic body 310. In some implementations, in the use position, the robotic system 300 may engage in bipedal walking.

As noted, the robotic system 300 includes the one or more protrusions 370. In the illustrated example, the one or more protrusions 370 may include four protrusions: a first protrusion 370A, a second protrusion 370B, a third protrusion 370C, and a fourth protrusion 370D. However, in other examples, the one or more protrusions 370 may include more or less than four protrusions. The number of protrusions of the one or more protrusions 370 may be selected based on one or more parameters of the robotic system 300 and/or an environment in which the robotic system 300 operates. For example, the number of protrusions of the one or more protrusions 370 may be selected based on the G-force of the robotic system 300, a predetermined speed or acceleration of the robotic system 300 in the use position, dimensions of the environment, terrain of the environment, or a number of obstacles in the environment.

As shown in FIG. 3, the first protrusion 370A may include a first end 372A and a second end 374A. The first end 372A of the first protrusion 370A may be connected to the robotic body 310 and located at a first elevation and the second end 374A of the first protrusion 370A may be located at a second elevation that is less than the first elevation. With this arrangement, the first protrusion 370A may extend from the robotic body 310 towards ground.

The first protrusion 370A may take various different forms in various different embodiments. For instance, in some examples, the first protrusion 370A may take the form of or be similar in form to a rod, a pole, a bar, a beam, etc. The first protrusion 370A may be constructed from any suitable material, such as rubber, plastic, carbon fiber, composites, e-glass, or one or more metals (e.g., steel). In some implementations, the first protrusion 370A may be a compliant material. Further, the first protrusion 370A may have various lengths and thicknesses. For instance, the first protrusion 370A may have a length that is greater than or less than the length of the robotic leg 350 or the length of the robotic leg 360.

Yet further, the first protrusion 370A may have various cross-section shapes, such as circular, elliptical, square, a square with rounded corners, rectangular, a rectangle with rounded corners, and/or triangular. In some implementations, the first protrusion 370A may have one cross-section shape. However, in some implementations, the first protrusion 370A may have one or more portions with different cross-section shapes. For instance, in the illustrated example, the first end 372A of the first protrusion 370A may have a circular cross-section shape and the second end 374A of the first protrusion 370A may have a square with rounded corners cross-section shape. Any portion of the first protrusion 370A may have any of the cross-section shapes described herein.

In an example, the second protrusion 370B, the third protrusion 370C, the fourth protrusion 370D may each take the form of or be similar in form to the first protrusion 370A. With this arrangement, the second protrusion 370B, the third protrusion 370C, and the fourth protrusion 370D may each include a first end and a second end, where each respective first end may take the form of or be similar in form to the first end 372A of the first protrusion 370A and each respective second end may take the form of or be similar in form to the second end 374A of the first protrusion 370A.

Moreover, in some examples, each protrusion of the one or more protrusions 370 may include the same or similar material, length, thickness, cross-section shape, etc. However, in other examples, at least one protrusion of the one or more protrusions 370 may include a different material, length, thickness, cross-section shape, etc.

In some implementations, the material, length, thickness, and/or the cross-section shape of the one or more protrusions 370 may be selected based on one or more parameters of the robotic system 300 and/or the environment in which the robotic system 300 operates. For example, the material, length, thickness, and/or the cross-section shape of the one or more protrusions 370 may be selected based on the G-force of the robotic system 300, a predetermined speed or acceleration of the robotic system 300 in the use position, the dimensions of the environment, the terrain of the environment, the number of obstacles in the environment, and/or the temperature of the environment.

As shown in FIG. 3, the one or more protrusions 370 may be connected to the robotic body 310 and may extend from the robotic body 310 at a non-perpendicular angle from the axis 312 of the robotic body 310. The one or more protrusions 370 may extend from the robotic body 310 in a variety of ways. For instance, in the illustrated example, the one or more protrusions 370 may radially extend from the center of mass 314 of the robotic body 310. However, in other examples, at least one protrusion of the one or more protrusions 370 may extend from another portion of the robotic body 310. For example, the first protrusion 370A, the second protrusion 370B, the third protrusion 370C, and/or the fourth protrusion 370D may extend from a portion of the robotic body 310 that is located at a higher or lower elevation than the center of mass 314 of the robotic body 310.

In another example, the first protrusion 370A, the second protrusion 370B, the third protrusion 370C, and/or the fourth protrusion 370D may extend from a portion of the robotic body 310 that is substantially parallel to the axis 312 of the robotic body 310. For instance, the first protrusion 370A, the second protrusion 370B, the third protrusion 370C, and/or the fourth protrusion 370D may extend from a portion of the robotic body 310 parallel to the axis 312 of the robotic body 310 or a deviation from parallel that does not cause the robotic system 300 to operate in a significantly different manner from when the first protrusion 370A, the second protrusion 370B, the third protrusion 370C, and/or the fourth protrusion 370D extend from a portion of the robotic body 310 that is parallel to the axis 312 of the robotic body 310.

Further, the one or more protrusions 370 may be connected to the robotic body 310 in a variety of ways. For instance, in some implementations, the one or more protrusions 370 may be detachably connected to the robotic body 310. With this arrangement, the one or more protrusions 370 may be connected to the robotic body 310 after other components of the robotic system 300 (e.g., robotic body 310 and two robotic legs 350 and 360) have been assembled or manufactured. In addition, detachably connecting the one or more protrusions 370 to the robotic body 310 may reduce a time period to replace or repair at least one protrusion of the one or more protrusions 370.

Moreover, in some implementations, the one or more protrusions 370 may be directly connected to the robotic body 310. For example, at least one protrusion of the one or more protrusions 370 may be directly (and detachably) connected to the robotic body 310 by a threaded connection between the first end of the protrusion and the robotic body 310. As another example, at least one protrusion of the one or more protrusions 370 may be directly (and detachably) connected to the robotic body 310 by a fastened connection via a suitable fastener (e.g., bolts with nuts, screws, pins, etc.) between the first end of the protrusion and the robotic body 310.

Further, in some implementations, the one or more protrusions 370 may be indirectly connected to the robotic body 310 by one or more other components. With this arrangement, the one or more other components may be connected to the robotic body 310 and the one or more protrusions 370 may be connected to the other component.

For example, the one or more protrusions 370 may be indirectly (and detachably) connected to the robotic body 310 by the one or more connectors 380. In the illustrated example, the one or more connectors 380 may include four connectors: the first connector 380A, the second connector 380B, the third connector 380C, and the fourth connector 380D. However, in other examples, the one or more connectors 380 may include more or less than four connectors. The number of the one or more connectors 380 may correspond with the number of protrusions of the one or more protrusions 370.

The first connector 380A may indirectly connect the first protrusion 370A to the robotic body 310. The first connector 380A may take various different forms in various different embodiments. In the illustrated example, the first connector 380A may include a joint 382A, a first plate 384A, a second plate 386A, a first fastener 388A-1, and a second fastener 388A-2. In some implementations, the first fastener 388A-1 and the second fastener 388A-2 may be any suitable fastener or combination of fasteners described herein, such as bolts with nuts. The joint 382A may be connected to the robotic body 310 and the first plate 384A in turn may be connected to the joint 382A. A portion of the first protrusion 370A may be located between the first plate 384A and the second plate 386A and the second plate 386A may be connected to the first plate 384A by the first fastener 388A-1 and the second fastener 388A-2.

The joint 382A may be connected to the robotic body 310 by any suitable connection, such as a welded connection, adhered connection, threaded connection, or fastened connection. Similarly, the first plate 384A may be connected to the joint 382A by any suitable connection, such as a welded connection, adhered connection, threaded connection, or fastened connection.

Further, the second connector 380B may indirectly connect the second protrusion 370B to the robotic body 310, the third connector 380C may indirectly connect the third protrusion 370C to the robotic body 310, and the fourth connector 380D may indirectly connect the fourth protrusion 370D to the robotic body 310. The second connector 380B, the third connector 380C, and the fourth connector 380D may indirectly connect the respective protrusions to the robotic body 310 in the same or similar way as the first connector 380A indirectly connects the first protrusion 370A to the robotic body 310.

In an example, the second connector 380B, the third connector 380C, and the fourth connector 380D may each take the form of or be similar in form to the first connector 380A. With this arrangement, the second connector 380B, the third connector 380C, and the fourth connector 380D may each include a joint, first plate, a second plate, a first fastener, and a second fastener, where each respective joint may take the form of or be similar in form to the joint 382A, each respective first plate may take the form of or be similar in form to the first plate 384A, each respective second plate may take the form of or be similar in form to the second plate 386A, each respective first fastener may take the form of or be similar in form to the first fastener 388A-1, and each respective second fastener may take the form of or be similar in form to the second fastener 388A-2.

In some examples, each protrusion of the one or more protrusions 370 may be connected in the same way to the robotic body 310. However, in other examples, at least one protrusion may be connected differently. For instance, a first protrusion (e.g., the first protrusion 370A) may be directly connected to the robotic body 310 and a second protrusion (e.g., the second protrusion 370B) may be indirectly connected to the robotic body 310.

Figure 4:
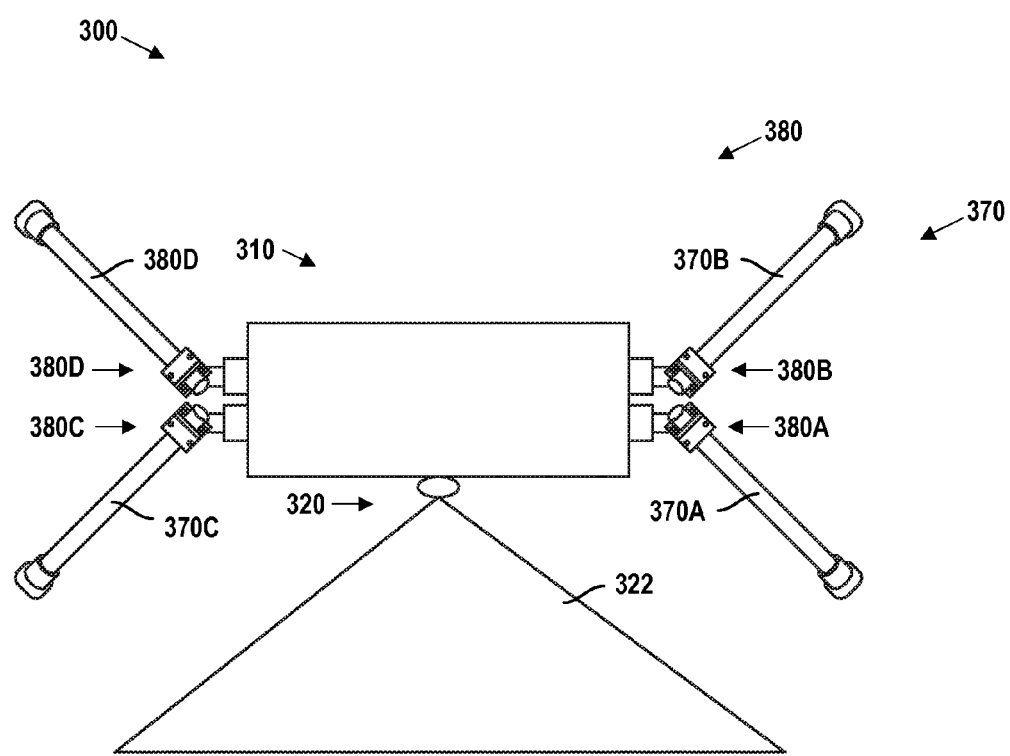
FIG. 4 depicts aspects of a robotic system, according to an example implementation.

FIG. 4 depicts aspects of the robotic system 300, according to an example implementation. In particular, FIG. 4 illustrates a top view of the robotic body 310, the sensor 320, the one or more protrusion 370, and the one or more connectors 380. The sensor 320 may be configured to receive information within a scanning area 322. In some implementations, the sensor 320 may be a laser scanner or a laser-displacement sensor.

The one or more protrusions 370 may be connected to the robotic body 310 and located outside of the scanning area 322 of the sensor 320. With this arrangement, the one or more protrusions 370 may not interfere with the sensor 320 receiving information within the scanning area 322. For instance, in the illustrated example, the scanning area 322 may be located between the first protrusion 370A and the third protrusion 370C.

Figure 5A:
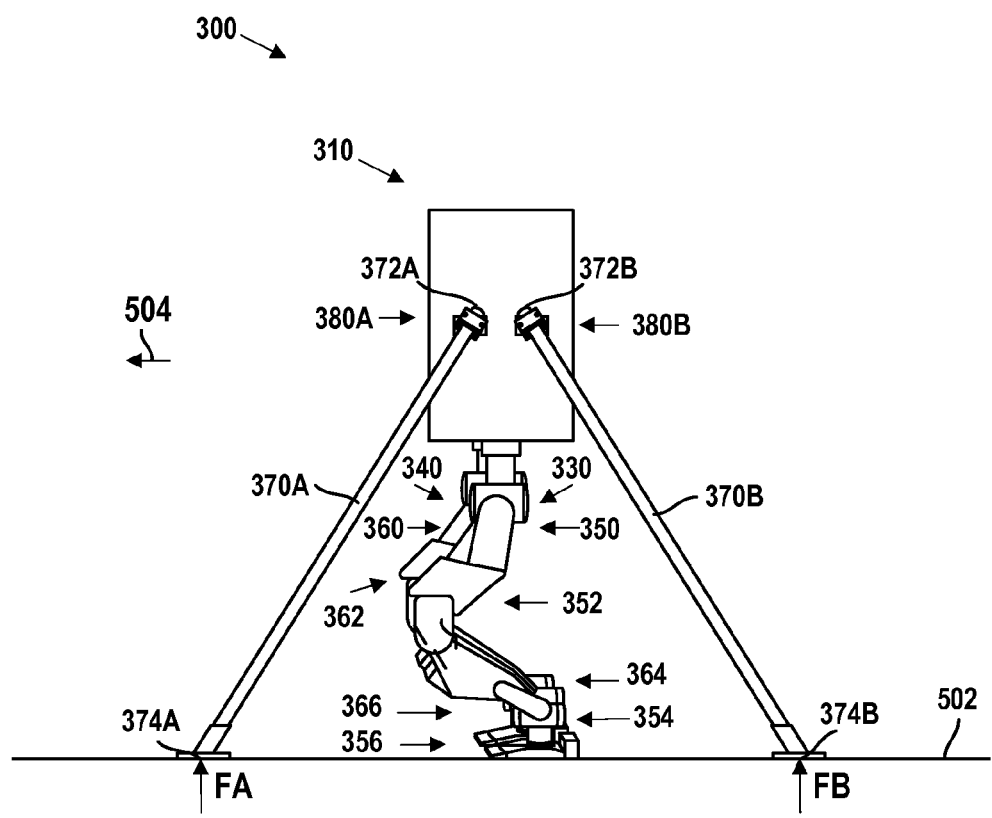
FIG. 5A depicts aspects of a robotic system in a starting position, according to an example implementation.

FIG. 5A depicts aspects of the robotic system 300 in the starting position, according to an example implementation. In particular, FIG. 5A illustrates a side view of the robotic body 310, the two robotic legs 350 and 360, the first protrusion 370A, the second protrusion 370B, the first connector 380A, and the second connector 380B. The second protrusion 370B may include a first end 372B and a second end 374B. The first end 372B of the second protrusion 370B may take the form of or be similar in form to the first end 372A of the protrusion 370A and the second end 374B of the second protrusion 370B may take the form of or be similar in form to the second end 374A of the first protrusion 370A.

In the starting position, the two robotic feet 356 and 366 may contact ground 502. In the illustrated example, in the starting position, the two robotic legs 350 and 360 may be bent. With this arrangement, in the starting position, the robotic system 300 may have a crouched posture. However, in other examples, in the starting position, the two robotic legs 350 and 360 may be extended and the robotic system 300 may have a straight posture. In addition, in the illustrated example, the robotic system 300 may be oriented in a direction 504. The two robotic feet 356 and 366 may contact a ground 502 that varies in form. For instance, the ground 502 may include terrain that is flat, sloped, hilly, and/or mountainous, among other possibilities.

In the starting position, the one or more protrusions 370 may be configured to support the robotic system 300. When the robotic system 300 is supported by the one or more protrusions 370, the one or more protrusions 370 may bear some or all of the weight of the robotic system 300. For example, as shown in FIG. 5A, in the starting position, the second end 374A of the first protrusion 370A may contact the ground 502 and apply a reaction force FA; and the second end 374B of the second protrusion 370B may contact the ground 502 and apply a reaction force FB.

In some implementations, in the starting position, the robotic system 300 may be in static equilibrium. When the robotic system 300 is in static equilibrium, the one or more protrusions 370 may apply a reaction force equal to the G-force of the robotic system 300. For example, when the robotic system 300 is in static equilibrium, FA and FB may each be equal to one quarter of the G-force of the robotic system 300. Accordingly, when the robotic system 300 is in static equilibrium, the sum of forces acting on a point on the robotic body 310, robotic leg 350, or robotic leg 360 may equal approximately zero.

When the robotic system 300 is supported by the one or more protrusions 370 in the starting position, other components of the robotic system 300 may not fall towards the ground 502 in certain directions. For example, when the robotic system 300 is supported by the one or more protrusions 370 in the starting position, the robotic body 310, the two robotic hips 330 and 340, the two robotic knees 352 and 362, and/or the two robotic ankles 354 and 364 may not fall towards the ground 502 in a direction that is substantially parallel to the direction 504, a direction substantially perpendicular (i.e., directed into or out of the page) to the direction 504, and/or a direction non-parallel and non-perpendicular to the direction 504. With this arrangement, in the starting position, the one or more protrusions 370 may help to prevent the robotic body 310, the two robotic hips 330 and 340, the two robotic knees 352 and 362, and/or the two robotic ankles 354 and 364 from contacting the ground 502.

Figure 5B:
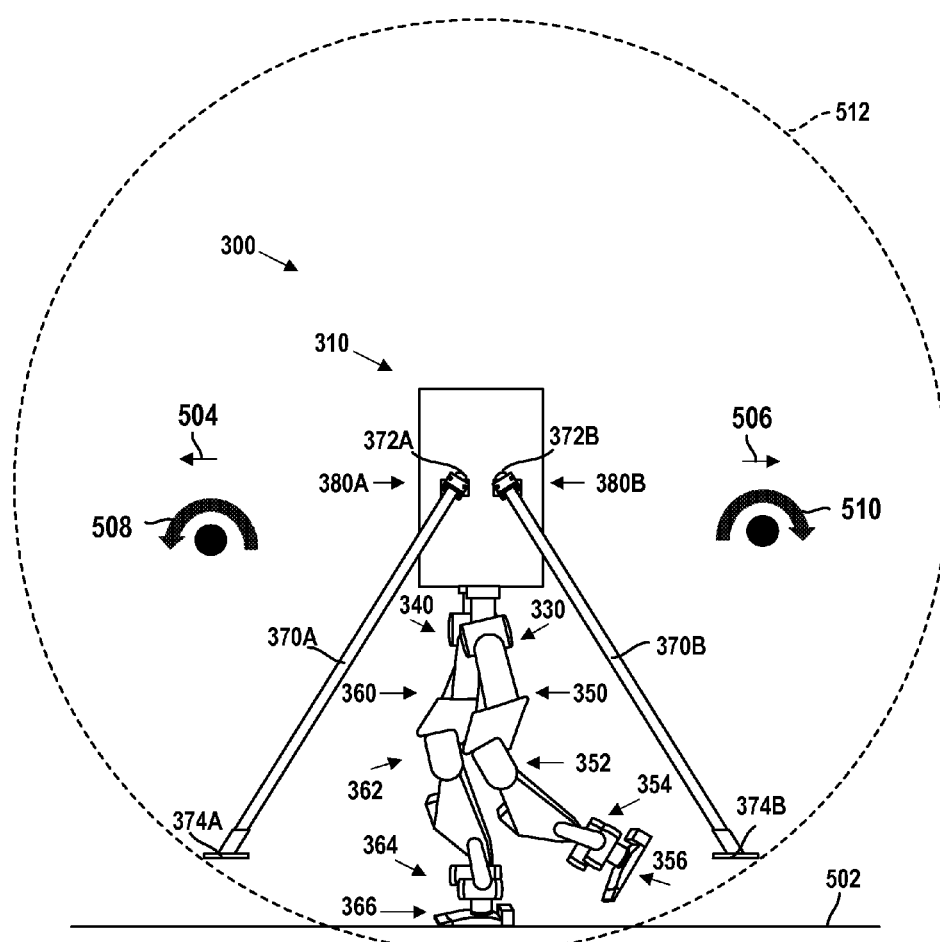
FIG. 5B depicts aspects of a robotic system in a use position, according to an example implementation

FIG. 5B depicts aspects of the robotic system 300 in the use position, according to an example implementation. In particular, FIG. 5B illustrates a side view of the robotic body 310, the two robotic legs 350 and 360, the first protrusion 370A, the second protrusion 370B, the first connector 380A, and the second connector 380B.

In the use position, the weight of the robotic system 300 may be supported by the robotic legs 350 or the robotic leg 360. Further, in the use position, the weight of the robotic system 300 may shift on to each of the robotic legs 350 and 360 interchangeably. In particular, the robotic foot 366 may contact the ground 502 and the robotic system 300 may shift the weight on to the robotic foot 366 as the robotic leg 350 swings forward to take a step (as illustrated in FIG. 5B). Further, the robotic foot 356 may contact the ground 502 and the robotic system 300 may shift the weight on to the robotic foot 356 as the robotic leg 360 swings forward to take a step. In the illustrated example, in the use position, the robotic system 300 may move in a direction substantially parallel to the direction 504.

In the use position, the one or more protrusions 370 may be configured to receive an external force when the robotic system 300 falls towards the ground 502, crashes into an obstacle in the environment in which the robotic system 300 operates, or otherwise fails. In particular, the second end of at least one protrusion of the one or more protrusions 370 may be configured to receive an external force when the robotic system 300 falls towards the ground 502 in certain directions, crashes into an obstacle in the environment, or otherwise fails.

For example, when the robotic system 300 falls towards the ground in a direction substantially parallel to the direction 504, the second end 374A of the first protrusion 370A and/or the second end of the third protrusion 370C (not shown) may receive the external force. As another example, when the robotic system 300 falls towards the ground in a direction 506 that is substantially opposite the direction 504, the second end 374B of the second protrusion 370B and/or the second end of the fourth protrusion 370D (not shown) may receive the external force. As another example, when the robotic system 300 falls towards the ground in a direction 508 that is directed out of the page (as indicated by the counterclockwise arrow), the second end 374A of the first protrusion 370A and/or the second end 374B of the second protrusion may receive the external force. And as another example, when the robotic system 300 falls toward the ground in a direction 510 that is directed into the page (as indicated by the clockwise arrow), the second end of the third protrusion 370C and/or the second end of the fourth protrusion 370D may receive the external force. Further, when the robotic system 300 crashes into an obstacle in the environment or otherwise fails, the second ends of some or all of the one or more protrusions 370 may receive the external force.

In some implementations, the one or more protrusions 370 may be configured to withstand receiving the external force when the robotic system 300 falls towards the ground 502, crashes into an obstacle in the environment, or otherwise fails. With this arrangement, the one or more protrusions 370 that received the external force may not be replaced or repaired after the robotic system 300 falls toward the ground 502, crashes into an obstacle in the environment, or otherwise fails.

Further, in some implementations, the one or more protrusions 370 may be configured to fail in response to receiving the external force when the robotic system falls towards the ground 502, crashes into an obstacle in the environment, or otherwise fails. The one or more protrusions 370 may fail in response to receiving the external force in a variety of ways. For example, the one or more protrusions 370 may deform, bend, break, rupture, and/or fracture in response to receiving the external force. With this arrangement, when the one or more protrusions 370 fails in response to receiving the external force, the one or more protrusions 370 may be replaced or repaired after the robotic system 300 falls towards the ground 502, crashes into an obstacle in the environment, or otherwise fails.

When the one or more protrusions 370 receive an external force when the robotic system 300 falls towards the ground 502, crashes into an obstacle in the environment, or otherwise fails, other components of the robotic system 300 (e.g., robotic body 310, two robotic hips 330 and 340, two robotic legs 350 and 360, two robotic knees 352 and 362, and/or two robotic ankles 354 and 364) may not receive the external force. With this arrangement, in the use position, the one or more protrusions 370 may help to reduce mechanical damage to the other components of the robotic system 300. In an example, the one or more protrusions 370 may define a sphere (depicted as circle 512 in FIG. 5B) and the one or more protrusions 370 may help to reduce mechanical damage to the other components of the robotic system 300 within the sphere.

Beneficially, replacing or repairing a failed protrusion of the one or more protrusions 370 may be less expensive than replacing or repairing other components of the robotic system 300 that are mechanically damaged by the robotic system 300 falling towards the ground 502, crashing into an obstacle in the environment, or otherwise failing. In addition, the time period to replace or repair the failed protrusion may be less than the time period to replace or repair other components of the robotic system 300 that are mechanically damaged by the robotic system 300 falling towards the ground 502, crashing into an obstacle in the environment, or otherwise failing.

Figure 6A:
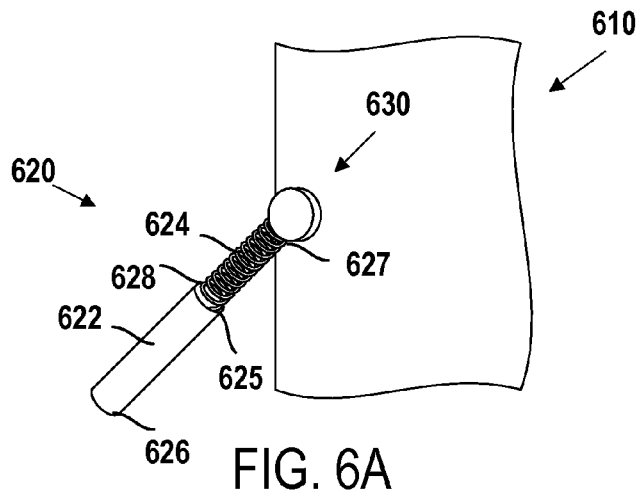
FIGS. 6A-6C depict aspects of protrusions connected to robotic bodies, according to example implementations.
Figure 6B:
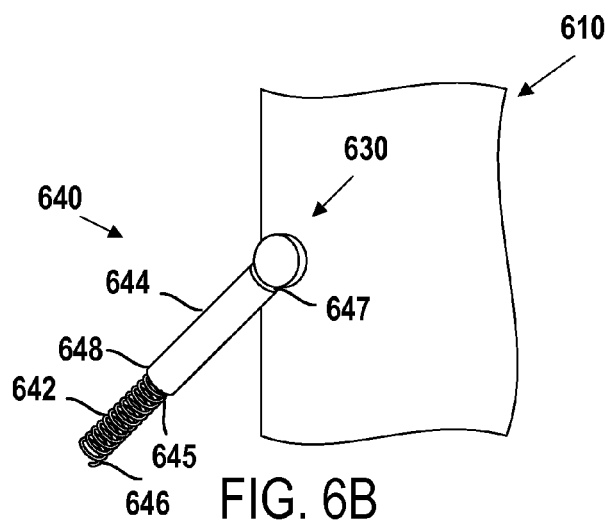
Figure 6C:
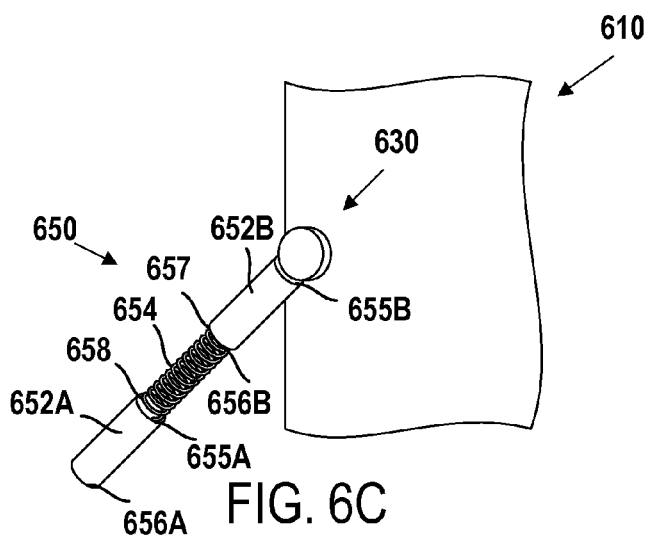

FIGS. 6A-6C depict aspects of protrusions connected to robotic bodies, according to example implementations. FIG. 6A depicts a protrusion 620 connected to a robotic body 610 by a connector 630. The robotic body 610 may take the form of or be similar in form to the robotic body 210 and/or the robotic body 310. Some or all of the one or more protrusions 370 may take the form of or be similar in form to the protrusion 620.

As shown in FIG. 6A, the protrusion 620 may include a rod 622 and a spring 624. The rod 622 may include a first end 625 and a second end 626. The spring 624 may include a first end 627 and a second end 628. The spring 624 may be connected to the robotic body 610 and the rod 622 in turn may be connected to the spring 624. In particular, the first end 627 of the spring 624 may be connected to the robotic body 610 by the connector 630, and the first end 625 of the rod 622 may be connected to the second end 628 of the spring 624. The first end 627 of the spring 624 may be connected to the connector 630 by any suitable threaded or fastened connection, and the first end 625 of the rod 622 may be connected to the second end 628 of the spring 624 by any suitable threaded or fastened connection.

The rod 622 may take various different forms in various different embodiments. For instance, the rod 622 may be constructed from any material that the first protrusion 370A may be constructed from. Further, the rod 622 may have various lengths and thicknesses. Yet further, the rod 622 may have any of the cross-section shapes that the first protrusion 370A may have. In the starting position, the second end 626 of the rod 622 may be configured to contact ground and apply a reaction force. And in the use position, the second end 626 of the rod 622 may be configured to receive an external force.

The spring 624 may take various different forms in various different embodiments. For instance, the spring 624 may be constructed from any suitable material, such as a metal (e.g., stainless steel), rubber, or a plastic. Further, the spring 624 may be a compression spring. In the use position, the spring 624 may be configured to deform in response to the second end 626 of the rod 622 receiving the external force. With this arrangement, the spring 624 may be configured to absorb some or all of the external force.

Although the protrusion 622 has been described above as including the rod 622, in other examples, the protrusion 622 may not include the rod 622. Instead, in such examples, the protrusion 622 may include a pole, a bar, or a beam connected to the spring 624. The pole, bar, or beam may include a second end that in the starting position may be configured to contact the ground and apply a reaction force and in the use position may be configured to receive an external force.

FIG. 6B depicts a protrusion 640 connected to the robotic body 610 by the connector 630. Some or all of the one or more protrusions 370 may take the form of or be similar in form to the protrusion 640.

As shown in FIG. 6B, the protrusion 640 includes a spring 642 and a rod 644. The spring 642 may include a first end 645 and a second end 646. The rod 644 may include a first end 647 and a second end 648. The rod 644 may be connected to the robotic body 610 and the spring 642 in turn may be connected to the rod 644. In particular, the first end 647 of the rod 644 may be connected to the robotic body 610 by the connector 630, and the first end 645 of the spring 642 may be connected to the second end 648 of the rod 644. The first end 647 of the rod 644 may be connected to the connector 630 by any suitable threaded or fastened connection, and the first end 645 of the spring 642 may be connected to the second end 648 of the rod 644 by any suitable threaded or fastened connection.

The rod 644 may take the form of or be similar in form to the rod 622. In addition, the spring 642 may take the form of or be similar in form to the spring 624. In the starting position, the second end 646 of the spring 646 may be configured to contact ground and apply a reaction force. And in the use position, the second end 646 of the spring 646 may be configured to receive an external force. In some implementations, the spring 642 may be configured to deform in response to the second end 646 of the spring 642 contacting the ground 502 and/or configured to deform in response to the second end 646 of the spring 642 receiving the external force. With this arrangement, the spring 642 may be configured to absorb some or all of the external force.

FIG. 6C depicts a protrusion 650 connected to the robotic body 610 by the connector 630. Some or all of the one or more protrusions 370 may take the form of or be similar in form to the protrusion 650.

As shown in FIG. 6C, the protrusion 640 includes a first rod 652A, a second rod 652B, and a spring 654. The first rod 652A may include a first end 655A and a second end 656A, the second rod 652B may include a first end 655B and a second end 656B, and the spring 654 may include a first end 657 and a second end 658. The second rod 652B may be connected to the robotic body 610, the spring 654 may be connected to the second rod 652B, and the first rod 652A may be connected to the spring 654.

In particular, the first end 655B of the second rod 652B may be connected to the robotic body 610 by the connector 630, the first end 657 of the spring 654 may be connected to the second end 656B of the second rod 652B, and the first end 655A of the first rod 652A may be connected to the second end 658 of the spring 654. The first end 655B of the second rod 652B may be connected to the connector 630 by any suitable threaded or fastened connection, the first end 657 of the spring 654 may be connected to the second end 656B of the second rod 652B by any suitable threaded or fastened connection, and the first end 655A of the first rod 652A may be connected to the second end 658 of the spring 654 by any suitable threaded or fastened connection.

The first rod 652A and the second rod 652B may take the form of or be similar in form to the rod 622 and/or the rod 644. In the starting position, the second end 656A of the first rod 652A may be configured to contact the ground and apply a reaction force. And in the use position, the second end 656A of the first rod 652A may be configured to receive an external force. In some examples, the first rod 652A and the second rod 652B may have the same or similar material, length, thickness, and/or cross-sectional shape. However, in other examples, the first rod 652A and the second rod 652B may have different materials, lengths, thicknesses, and/or cross-section shapes.

The spring 654 may take the form of or be similar in form to the spring 624 and/or the spring 642. In some implementations, the spring 654 may be configured to deform in response to the second end 656A of the first rod 652A receiving the external force. With this arrangement, the spring 654 may be configured to absorb some or all of the external force.

Although in the robotic system 300, the respective first ends of the one or more protrusions 370 may be located at respective first elevations and the respective second ends of the one or more protrusions 370 may be located at respective second elevations that are less than the respective first elevations, in other examples a robotic system may further include one or more second protrusions wherein at least one protrusion of the one or more second protrusions may include a first end located at a first elevation and a second end located at a second elevation that is greater than the first elevation.

Figure 7:
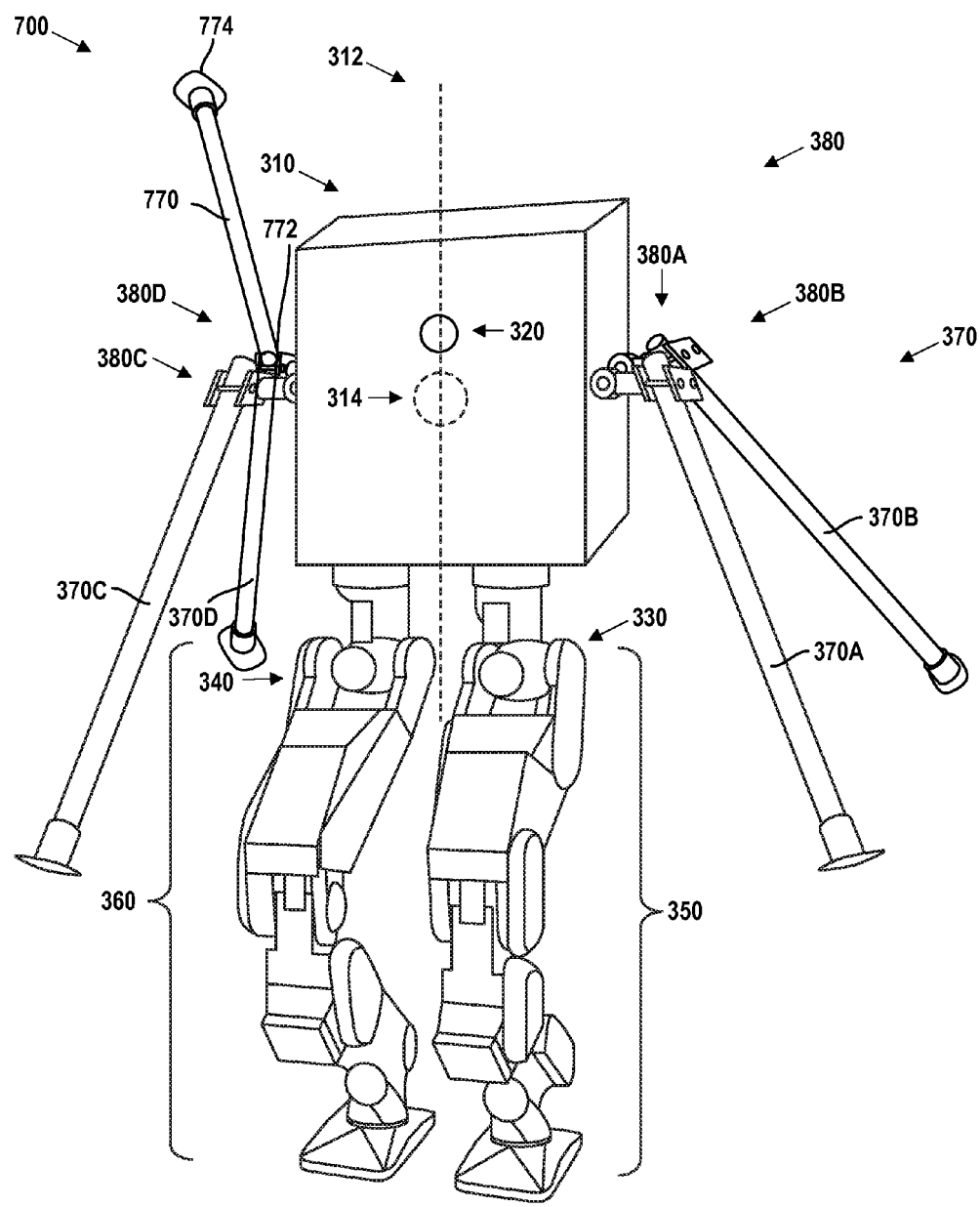
FIG. 7 depicts aspects of a robotic system, according to an example implementation.

FIG. 7 depicts aspects of a robotic system, according to an example implementation. The robotic system 700 may include one or more parts of the robotic systems described above in relation to FIGS. 1 and 2 in the same or similar way as the robotic system 300 includes one or more parts of the robotic systems described above in relation to FIGS. 1 and 2. For example, the robotic legs 350 and 360 may include actuators 108 and sensors 110 such as a sensor that measures inertial forces and or G-forces in multiple dimensions, a force-torque sensor, a ground force sensor, a friction sensor, and/or a ZMP sensor, among other possibilities. Further, the robotic system 700 may include one or more motors that generate heat and are cooled by lower temperature liquids around the motors. As such, the robotic system 700 may engage in bipedal walking.

The robotic system 700 may include the robotic body 310, the sensor 320 connected to the robotic body 310, the two robotic hips 330 and 340 connecting the robotic body 310 to the two robotic legs 350 and 360, the one or more protrusions 370, the one or more connectors 380, and a second protrusion 770. The robotic body 310 may include the axis 312 and may have the center of mass 314. The second protrusion 770 may include a first end 772 and a second end 774. Components in FIG. 7 similar to those in FIGS. 3-5 may be of the same configuration and function in a similar manner.

The second protrusion 770 may extend from the robotic body 310 at a non-perpendicular angle from the axis 312 of the robotic body 310 in the same or similar way as the one or more protrusions 370 in the robotic system 300. Further, the second protrusion 770 may be connected to the robotic body 310 and located outside of the scanning area 322 of the sensor 320 in the same or similar way as the one or more protrusions 370 in the robotic system 300. The second protrusion 770 may take the form of or be similar in form to the first protrusion 370A, the protrusion 620, the protrusion 640, and/or the protrusion 650; the first end 772 of the second protrusion 770 may take the form of or be similar in form to the first end 372A of the first protrusion 370A; and the second end 774 of the second protrusion 770 may take the form of or be similar in form to the second end 374A of the first protrusion 370A. The second protrusion 770 may be connected to the robotic body 310 by any connection that the one or more protrusions 370 are connected to the robotic body 310. In the illustrated example, the second protrusion 770 may be connected to the robotic body 310 by a connector (not shown) that may take the form of or be similar in form to the first connector 380A.

As shown in FIG. 7, the first end 772 of the second protrusion 770 may be connected to the robotic body 310 and is located at a first elevation and the second end 774 of the second protrusion 770 may be located at a second elevation that is greater than the first elevation. With this arrangement, the second protrusion 770 may extend from the robotic body 310 away from ground.

Figure 8:
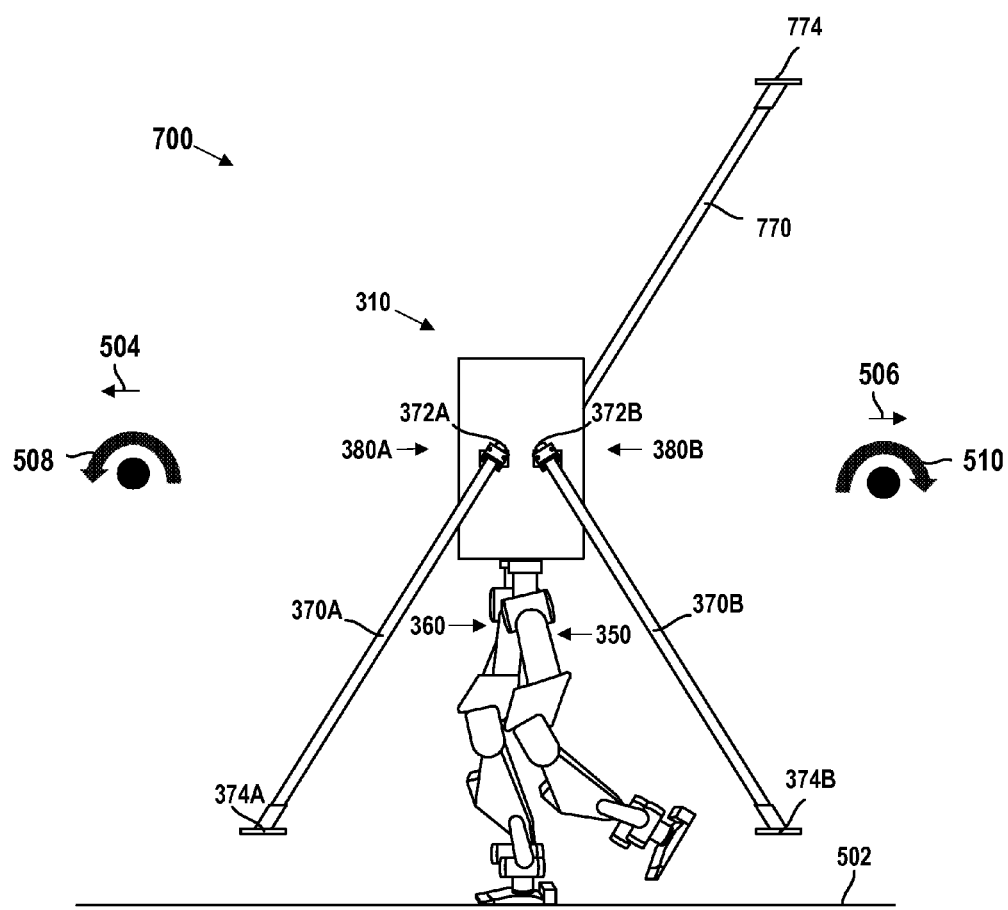
FIG. 8 depicts aspects of a robotic system in a use position, according to an example implementation.

FIG. 8 depicts aspects of the robotic system 700 in the use position, according to an example implementation. In particular, FIG. 8 illustrates a side view the robotic body 310, the two robotic legs 350 and 360, the first protrusion 370A, the second protrusion 370B, the first connector 380A, the second connector 380B, and the second protrusion 770.

In the use position, the weight of the robotic system 700 may be supported by the robotic leg 350 or the robotic leg 360 in the same or similar way as the robotic system 300. Moreover, in the use position, the one or more protrusions 370 and/or the second protrusion 770 may be configured to receive an external force when the robotic system 700 falls towards the ground 502, crashes into an obstacle in the environment in which the robotic system 300 operates, or otherwise fails. In particular, the second ends of the one or more protrusions 370 and/or the second end 772 of the second protrusion 770 or a portion of the second protrusion 770 may be configured to receive an external force when the robotic system 700 falls towards the ground 502 in certain directions, crashes into an obstacle in the environment, or otherwise fails.

For example, when the robotic system 700 falls towards the ground in a direction that is substantially parallel to the direction 504, the second end 374A of the first protrusion 370A and/or the second end of the third protrusion 370C (not shown) may receive the external force. As another example, when the robotic system 700 falls towards the ground in the direction 506, the second end 374B of the second protrusion 370B, the second end of the fourth protrusion 370D (not shown) may receive the external force, and/or a portion of the second protrusion 770 may receive the external force. As another example, when the robotic system 700 falls towards the ground in the direction 508, the second end 374A of the first protrusion 370A and/or the second end 374B of the second protrusion may receive the external force. And as another example, when the robotic system 700 falls towards the ground in the direction 510, the second end of the third protrusion 370C, the second end of the fourth protrusion 370D, and/or a portion of the second protrusion 770 may receive the external force. Further, when the robotic system 300 crashes into an obstacle in the environment or otherwise fails, the second ends of some or all of the one or more protrusions 370, the second end 774 of the second protrusion 770, and/or a portion of the second protrusion 770 may receive the external force.

Although the robotic system 700 has been described above as including one second protrusion 770, in other examples, a robotic system may include two or more second protrusions.

Figure 9:
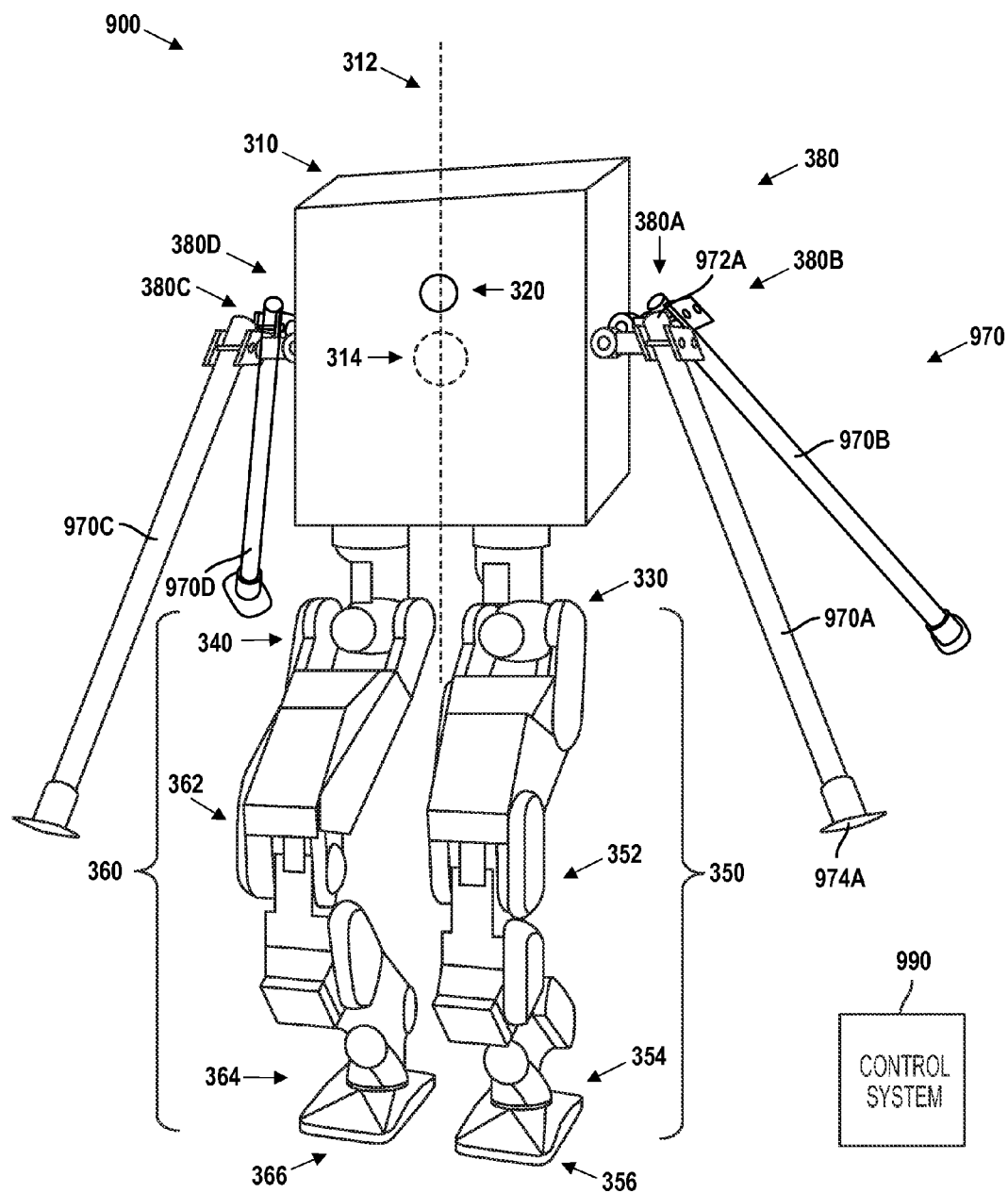
FIG. 9 depicts aspects of a robotic system, according to an example implementation.

FIG. 9 depicts aspects of a robotic system, according to an example implementation. The robotic system 900 may include one or more parts of the robotic systems described above in relation to FIGS. 1 and 2 in the same or similar way as the robotic system 300 includes one or more parts of the robotic systems described above in relation to FIGS. 1 and 2. For example, the robotic legs 350 and 360 may include actuators 108 and sensors 110 such as a sensor that measures inertial forces and or G-forces in multiple dimensions, a force-torque sensor, a ground force sensor, a friction sensor, and/or a ZMP sensor, among other possibilities. Further, the robotic system 900 may include one or more motors that generate heat and are cooled by lower temperature liquids around the motors. As such, the robotic system 900 may engage in bipedal walking.

The robotic system 900 may include the robotic body 310, the sensor 320 connected to the robotic body 310, the two robotic hips 330 and 340 connecting the robotic body 310 to the two robotic legs 350 and 360, one or more protrusions 970, the one or more connectors 380, and a control system 990. The robotic body 310 may include the axis 312 and may have the center of mass 314.

In the illustrated example, the one or more protrusions 970 may include four protrusions: a first protrusion 970A, a second protrusion 970B, a third protrusion 970C, and a fourth protrusion 970D. However, in other examples, the one or more protrusions 970 may include more or less than four protrusions. The number of protrusions of the one or more protrusions 970 may be selected in the same or similar way as the number of protrusions of the one or more protrusions 370. The first protrusion 970A may include a first end 972A and a second 974A.

The one or more protrusions 970 in FIG. 9 may be of the same configuration as the one or more protrusions 370 in FIGS. 3-5. In addition, the one or more protrusions 970 may be configured to retract and/or deploy. With this arrangement, the one or more protrusions 970 may be actively controlled.

In some implementations, the control system 990 may be configured to perform one or more functions described herein. The control system 990 may be implemented with mechanical systems and/or with hardware, firmware, and/or software. As one example, the control system 990 may take the form of program instructions stored on a non-transitory computer readable medium and a processor that executes the instructions. In some implementations, the non-transitory computer readable medium may take the form of the non-transitory computer readable medium described above in relation to FIG. 1. The control system 990 may be implemented in whole or in part on the robotic system 900 and/or at least one entity remotely located from the robotic system 900. Generally, the manner in which the control system 990 is implemented may vary, depending upon the particular application.

Figure 10A:
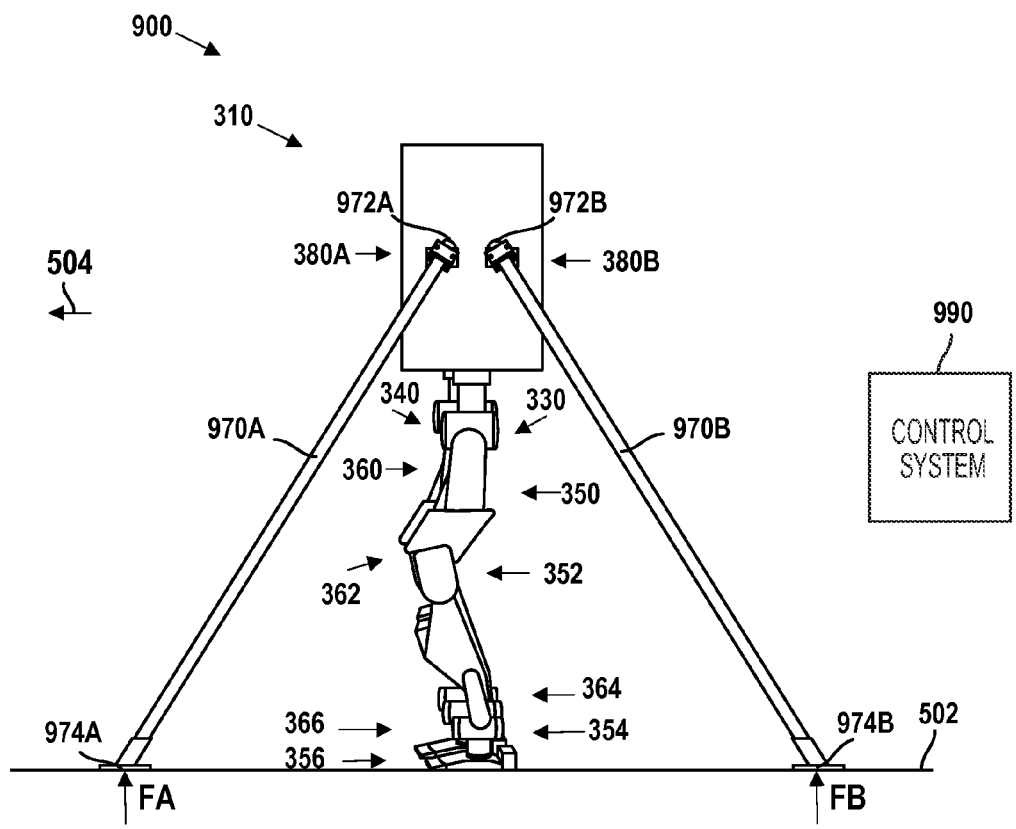
FIG. 10A depicts aspects of a robotic system in a starting position, according to an example implementation.

FIG. 10A depicts aspects of the robotic system 900 in the starting position, according to an example implementation. In particular, FIG. 10A illustrates a side view of the robotic body 310, the two robotic legs 350 and 360, the first protrusion 970A, the second protrusion 970B, the first connector 380A, and the second connector 380B. The second protrusion 970B may include a first end 972B and a second end 974B. The first end 972B of the second protrusion 970B may take the form of or be similar in form to the first end 972A of the protrusion 970A and the second end 974B of the second protrusion 970B may take the form of or be similar in form to the second end 974A of the first protrusion 970A.

In the starting position, the two robotic feet 356 and 366 may contact the ground 502. In the illustrated example, in the starting position, the two robotic legs 350 and 360 may be extended and the robotic system 900 may have a straight posture. However, in other examples, in the starting position, the two robotic legs 350 and 360 may be bent. With this arrangement, in the starting position, the robotic system 300 may have a crouched posture. In addition, in the illustrated example, the robotic system 900 may be oriented in the direction 504.

In the starting position, the one or more protrusions 970 may be configured to support the robotic system 900 in the same or similar way as in the starting position the one or more protrusions 370 are configured to support the robotic system 300. For instance, as shown in FIG. 10A, in the starting position, the second end 974A of the first protrusion 970A may contact the ground 502 and apply a reaction force FA; and the second end 974B of the second protrusion 970B may contact the ground 502 and apply a reaction force FB.

In some implementations, in the starting position, the robotic system 900 may be in static equilibrium. When the robotic system 900 is in static equilibrium, the one or more protrusions 970 may apply a reaction force equal to the G-force of the robotic system 900. For example, when the robotic system 900 is in static equilibrium, FA and FB may each be equal to one quarter of the G-force of the robotic system 900. Accordingly, when the robotic system 900 is in static equilibrium, the sum of forces acting on a point on the robotic body 310, robotic leg 350, or robotic leg 360 may equal approximately zero.

In the illustrated example, the first protrusion 970A may have a length that is greater than the length of the first protrusion 370A, and the second protrusion 970B may have a length that is greater than the length of the second protrusion 370B. However, in other examples, the first protrusion 970A may have the same or similar length as the first protrusion 370A and the second protrusion 970B may have the same or similar length as the second protrusion 370B.

Figure 10B:
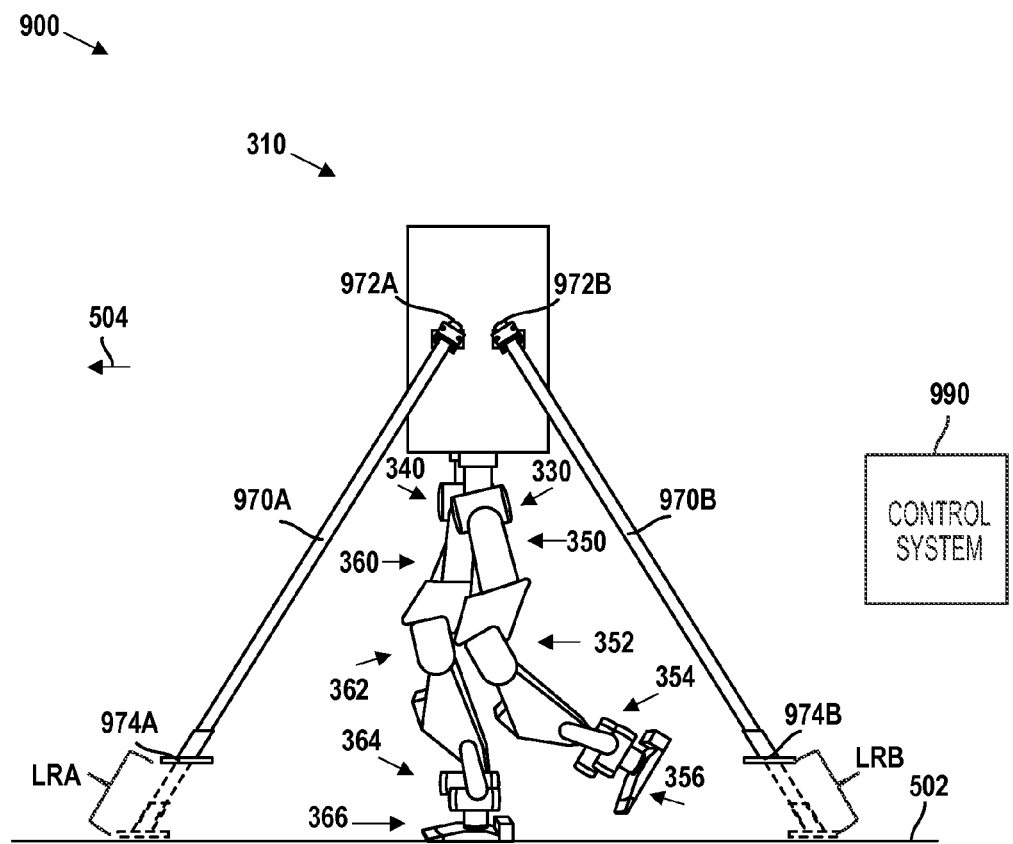
FIG. 10B depicts aspects of a robotic system in a use position, according to an example implementation.
Figure 10C:
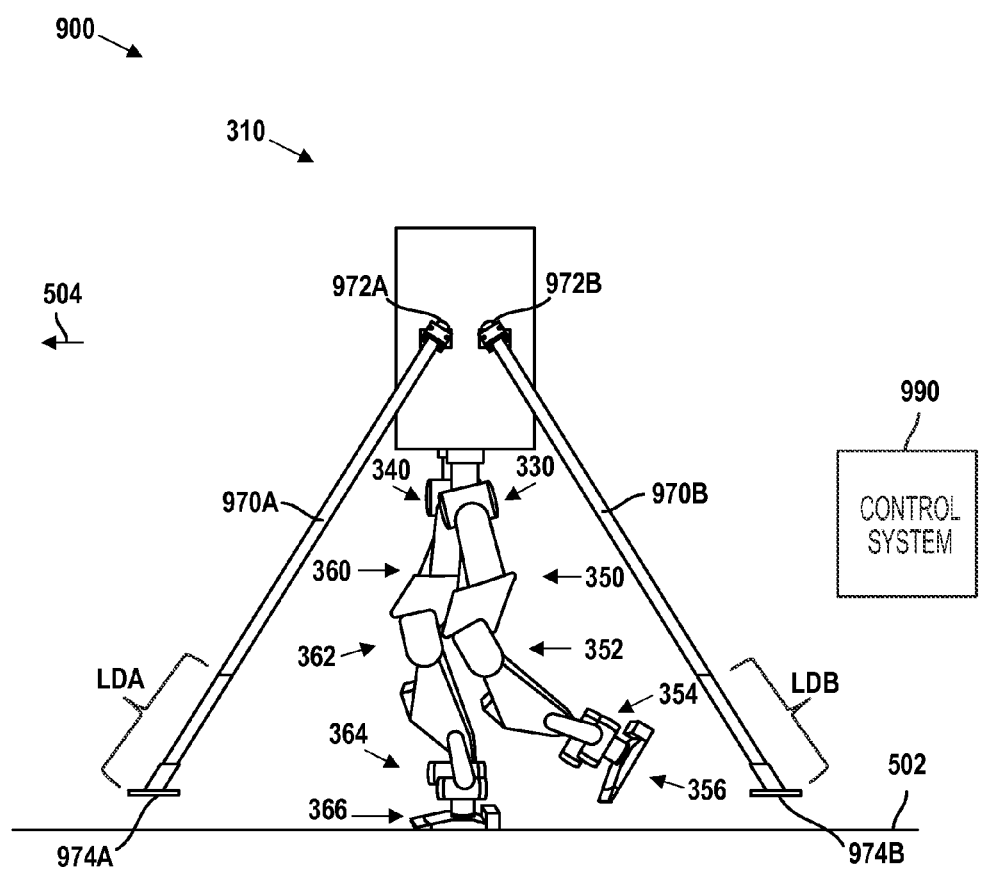
FIG. 10C depicts aspects of a robotic system in a use position, according to an example implementation.

FIGS. 10B and 10C depict the robotic system 900 in the use position, according to an example implementation. In particular, FIGS. 10B and 10C show a side view of the robotic body 310, the two robotic legs 350 and 360, the first protrusion 970A, the second protrusion 970B, the first connector 380A, and the second connector 380B In the use position, the weight of the robotic system 900 may be supported by the robotic leg 350 or the robotic leg 360 in the same or similar way as in the use position the weight of the robotic system 300 may be supported by the robotic leg 350 or the robotic leg 360. Further, in the use position, the weight of the robotic system 300 may shift on to each of the robotic legs 350 and 360 interchangeably. In particular, the robotic foot 366 may contact the ground 502 and the robotic system 300 may shift the weight on to the robotic foot 366 as the robotic leg 350 swings forward to take a step (as illustrated in FIGS. 10B and 10C). Further, the robotic foot 356 may contact the ground 502 and the robotic system 900 may shift the weight on to the robotic foot 356 as the robotic leg 360 swings forward to take a step. In the illustrated example, in the use position, the robotic system 900 may move in a direction substantially parallel to the direction 504.

Moreover in the use position, the one or more protrusions 970 may be configured to receive an external force when the robotic system 900 falls towards the ground 502, crashes into an obstacle in an environment in which the robotic system 900 operates, or otherwise fails. In the use position, the one or more protrusions 970 may be configured to receive the external force in the same or similar way as the one or more protrusions 370 may be configured to receive an external force in the robotic system 300.

FIG. 10B depicts aspects of the robotic system 900 in the use position, according to an example implementation. In the use position, some or all of the one or more protrusions 970 may be retracted. Retraction of some or all of the one or more protrusions 970 may help to improve the movement of the robotic system 900 in a direction that is substantially parallel to the direction 504.

As shown in FIG. 10B, in the use position, the first protrusion 970A may be retracted a length LRA and the second protrusion 970B may be retracted a length LRB. In the illustrated example, the length LRA may be substantially the same as the length LRB. For instance, the length LRA may be the same as the length LRB or a deviation from the same that does not cause the robotic system 900 to operate in a significantly differently manner than when the length LRA is the same as the length LRB. However, in other examples, the length LRA may be greater than or less than the length LRB. In some implementations, the one or more protrusions 970 may retract based at least in part on a force applied by a gas (e.g., air) to the one or more protrusions 970.

In some implementations, the control system 990 may be configured to (i) make a determination that the robotic system 900 is in the use position and (ii) in response to the determination that the robotic system is in the use position, the control system 990 may retract some or all of the protrusions of the one or more protrusions 970. The control system 990 may receive data from the sensors 110 and the determination that the robotic system 900 is in the use position may be based at least in part on the data received from the sensors 110. In addition, the control system 990 make a determination that the actuators 108 are not in a fixed position, and the determination that the robotic system 900 is in the use position may be based at least in part on the determination that the actuators 108 are not in a fixed position.

In addition, in some implementations, the control system 990 may be configured to (i) make a determination that the robotic system 900 is in the use position and (ii) in response to the determination that the robotic system is in the use position, the control system 990 may cause refraction of some or all of the protrusions of the one or more protrusions 970.

Further, in some implementations, some or all of the one or more protrusions 970 may be retracted at substantially the same time. For instance, some or all of the one or more protrusions 970 may be refracted at the same time or a deviation from the same that does not cause the robotic system 900 to operate in a significantly different manner from when some or all of the one or more protrusions 970 are retracted at the same time. As one example, the control system 990 may retract the first protrusion 970A and the second protrusion 970B at a first time period. As another example, the control system 990 may cause retraction of the first protrusion 970A and the second protrusion 970B at a first time period Moreover, in some implementations, at least one protrusion of the one or more protrusions 970 may be retracted at a different time period. As one example, the control system 990 may retract the first protrusion 970A at a first time period and the control system 990 may retract the second protrusion 970B at a second time period. As another example, the control system 990 may cause retraction of the first protrusion 970A at a first time period and the control system 990 may cause retraction of the second protrusion 970B at a second time period.

FIG. 10C depicts aspects of the robotic system 900 in the use position. In the use position, some or all of the one or more protrusions 970 may be deployed (or extended). Deployment of some or all of the one or more protrusions 970 may help the deployed protrusions receive the external force when the robotic system 900 falls towards the ground 502, crashes into an obstacle in an environment in which the robotic system 900 operates, or otherwise fails. Accordingly, deployment of some or all of the one or more protrusions may reduce mechanical damage of other components of the robotic system 900 (e.g., robotic body 310, two robotic hips 330 and 340, two robotic legs 350 and 360, two robotic knees 352 and 362, and/or two robotic ankles 354 and 364) when the robotic system 900 falls towards the ground 502, crashes into an obstacle in an environment in which the robotic system 900 operates, or otherwise fails.

As shown in FIG. 10C, in the use position, the first protrusion 970A may be deployed a length LDA and the second protrusion 970B may be deployed a length LDB. In the illustrated example, the length LDA may be substantially the same as the length LDB. For instance, the length LDA may be the same as the length LDB or a deviation from the same that does not cause the robotic system 900 to operate in a significantly differently manner than when the length LDA is the same as the length LDB. However, in other examples, the length LDA may be greater than or less than the length LDB. In some implementations, the one or more protrusions 970 may each include a pre-loaded spring and deploying the one or more protrusions may involve triggering (e.g., releasing) the respective springs.

Further, in some implementations, the control system 990 may be configured to (i) make a determination of an emergency event and (ii) in response to the determination of the emergency event, deploy some or all of the protrusions of the one or more protrusions 970. The control system may receive data from the sensors 110 and the determination of the emergency event may be based at least in part on the data received from the sensors 110. In addition, the control system 990 may be configured to detect an acceleration of the robotic system 900 and the determination of the emergency event is based at least in part on the acceleration of the robotic system 900. The control system 990 may receive data from the sensors 110 to detect the acceleration of the robotic system 900. Moreover, the control system 990 may be configured to detect an impending crash of the robotic system 900 and the determination of the emergency event may be based at least in part on the impending crash of the robotic system 900. The control system 990 may receive data from the sensors 110 to detect the impending crash of the robotic system 900.

In addition, in some implementations, the control system 990 may be configured to (i) make a determination of an emergency event and (ii) in response to the determination of the emergency event, cause deployment of some or all of the protrusions of the one or more protrusions 970.

Further, in some implementations, some or all of the one or more protrusions 970 may be deployed at substantially the same time. For instance, some or all of the one or more protrusions 970 may be deployed at the same time or a deviation from the same that does not cause the robotic system 900 to operate in a significantly different manner from when some or all of the one or more protrusions 970 are deployed at the same time. As one example, the control system 990 may deploy the first protrusion 970A and the second protrusion 970B at a first time period. As another example, the control system 990 may cause deployment of the first protrusion 970A and the second protrusion 970B at a first time period Moreover, in some implementations, at least one protrusion of the one or more protrusions 970 may be deployed at a different time period. As one example, the control system 990 may deploy the first protrusion 970A at a first time period and the control system 990 may deploy the second protrusion 970B at a second time period. As another example, the control system 990 may cause deployment of the first protrusion 970A at a first time period and the control system 990 may cause deployment of the second protrusion 970B at a second time period.

Yet further, in some implementations, some or all of the one or more protrusions 970 may be refracted and then deployed. For instance, in the use position, the control system 990 may be configured to retract some or all of the protrusions 970 at a first time period and deploy the retracted protrusions at a second time period. As one example, the control system 990 may be configured to retract the first protrusion 970A and the second protrusion 970B at a first time period and deploy the first protrusion 970A and the second protrusion 970B at a second time period. Further, the control system 990 may be configured to cause retraction of some or all of the protrusions 970 at a first time period and cause deployment of the refracted protrusions at a second time period.

In addition, in the use position, the control system 990 may be configured to retract and deploy protrusions at different time periods. As one example, the control system 990 may be configured to retract the first protrusion 970A at a first time period, retract the second protrusion 970B at a second time period, deploy the first protrusion 970A at a third time period, and deploy the second protrusion 970B at a fourth time period. Further, the control system 990 may be configured to cause retraction and deployment of protrusions at different time periods.

In some implementations, the robotic system 900 may include a non-transitory computer-readable medium that stores program instructions executable by one or more processors, such as the processor 106 of the robotic system 100 described above in relation to FIG. 1. The program instructions may cause the robotic system 900 to perform operations. The operations may include determining the robotic system 900 is in the use position. Further, the operations may include in response to the determination that the robotic system 900 is in the use position, causing retraction of at least one protrusion of the one or more protrusions 970.

In addition, the operations may include determining an emergency event. Further, the operations may include in response to the determination of the emergency event, causing deployment of at least one protrusions of the one or more protrusions 970.

Moreover, the operations may include determining the robotic system 900 is in the use position. Further, the operations may include in response to the determination that the robotic system 900 is in the use position, causing refraction of at least one protrusion of the one or more protrusions 970 at a first time period. Yet further, the operations may include determining an emergency event. Yet further, the operations may include in response to the determination of the emergency event, causing deployment of the at least one protrusion of the one or more protrusions 970 at a second time period.

Figure 11:
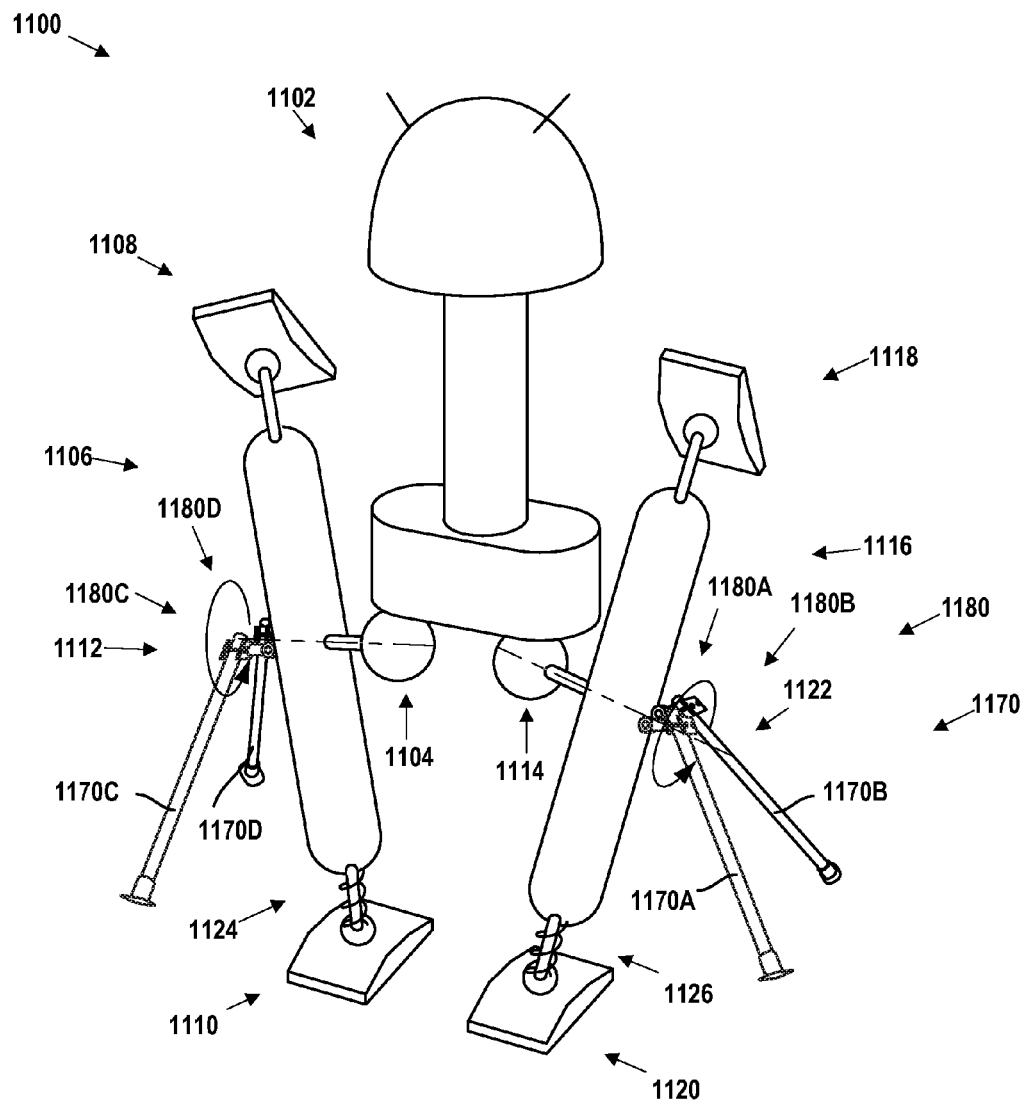
FIG. 11 depicts aspects of a robotic system, according to an example implementation.

FIG. 11 depicts aspects of a robotic system, according to an example implementation. The robotic system 1100 may take, for example, the form of a bipedal robot device and/or a multi-legged robot device such as a quadruped robot device, among various possibilities. Further, the robotic system 1100 may include, for instance, one or more of the parts described above in relation to robotic systems described above in relation to FIGS. 1 through 10.

As shown in FIG. 11, the robotic system 1100 may include a robotic body 1102, a robotic hip 1104 connected to the robotic body 1102, and a robotic leg 1106 connected to the robotic hip 1104. A first robotic foot 1108 may be connected to one end of the robotic leg 1106 and a second robotic foot 1110 may be connected to an opposite end of the robotic leg 1106. The robotic leg 1106 may be fully rotatable around an axis of rotation 1112 defined by the robotic hip 1104. Further, the robotic hip 1104 may be linearly movable along the robotic leg 1106 to one or more positions between the one end of the robotic leg 1106 and the opposite end of the robotic leg 1106.

Yet further, the robotic system 1100 may include a second robotic hip 1114 connected to the robotic body 1102 and a second robotic leg 1116 connected to the second robotic hip 1114. A third robotic foot 1118 may be connected to one end of the second robotic leg 1116 and a fourth robotic foot 1120 may be connected to an opposite end of the second robotic leg 1116. The second robotic leg 1116 may be fully rotatable around a second axis of rotation 1122 defined by the second robotic hip 1114, as shown by the circular arrow around the second axis of rotation 1122. In addition, the second robotic hip 1114 may be linearly movable along the second robotic leg 1116 to one or more positions between the one end of the second robotic leg 1116 and the opposite end of the second robotic leg 1116. For example, the second robotic hip 1114 may be linearly moveable the robotic leg 1116 to one or more positions between the third robotic foot 1118 and the fourth robotic foot 1120.

Further, the robotic leg 1106 and the second robotic leg 1108 may be partially or fully rotatable in the opposite directions of the circular arrows around the axes of rotation 1112 and 1122, respectively. The robotic legs 1106 and 1108 may rotate over varying axes of rotation 1112 and 1122, respectively. For example, the robotic hips 1104 and 1114 may be moveable over multiple degrees of freedom (DOF) to vary the axes of rotation 1112 and 1122, respectively. In particular, the robotic hips 1104 and 1106 may include ball and socket mechanisms to be movable over the multiple DOF, possibly to change the axes of rotation 1112 and 1122, respectively.

In some implementations, the robotic system 1100 may include different types of robotic feet, possibly for bipedal walking without the windmill type movements. For example, the second robotic foot 1110 may include a rubber base that facilitates friction against adjacent surfaces. For example, the rubber base may take the form of a rain shoe that creates friction against the adjacent surfaces covered in rain, snow, and/or other forms of liquids. Further, the first robotic foot 1108 may include a wider base than the rubber base. For example, the wider base may distribute the weight of the robotic system 1100 over more area of the adjacent surfaces than the rubber base. In some implementations, the wider base may take the form of a snow shoe that distributes the weight of the robotic system 1100 over more area of the adjacent surfaces covered in snow. Further, the third robotic foot 1118 may take any of the forms of the robotic foot 1108 and the fourth robotic foot 1120 may take any of the forms of the robotic foot 1110, among other possibilities.

In some implementations, the robotic system 1100 may include different types of robotic legs and/or robotic feet for various types of movements of the robotic system 1100. Further, the robotic system 1100 may include different types of feet for walking, jogging, running, and/or jumping. For example, the robotic foot 1108 and the third robotic foot 1118 may be used for walking, and the second robotic foot 1110 and the fourth robotic foot 1120 may be used for running and jumping, among other possibilities. Further, the robotic leg 1106 may include a first spring 1124 that applies a first force against the second robotic foot 1110. Further, the second robotic leg 1116 may include a second spring 1126 that applies a second force against the fourth robotic foot 1120. As such, the first spring and the second spring may store energy for applying the first force and the second force, respectively, thereby springing the robotic system 1100 off ground surfaces.

In some implementations, the robotic system 1100 may include a non-transitory computer-readable medium that stores program instructions executable by one or more processors, such as the processor 106 of the robotic system 100 described above in relation to FIG. 1. The program instructions may cause the robotic system 1100 to perform operations. For example, the robotic hip 1104 may move along the robotic leg 1106 to a first position of the one or more positions between the one end of the robotic leg 1106 and the opposite end of the robotic leg 1106. Further, the second robotic hip 1114 may move along the second robotic leg 1116 to a second position of the one or more positions between the one end of the second robotic leg 1116 and the opposite end of the second robotic leg 1116.

In some implementations, a first length of the robotic leg 1106 may be approximately equivalent to a second length of the second robotic leg 1116. For example, the first position may be approximately half way between the one end of the robotic leg 1106 proximately connected to the first robotic foot 1108 and the opposite end of the robotic leg 1106 proximately connected to the second robotic foot 1110. Further, the second position may be approximately half way between the one end of the second robotic leg 1116 proximately connected to the third robotic foot 1118 and the opposite end of the second robotic leg 1116 proximately connected to the fourth robotic foot 1120. As such, the robotic system 1100 may stand such that the robotic hip 1104 may be approximately level with the second robotic hip 1114.

In some implementations, the robotic system 1100 may cause the robotic leg 1106 to rotate up to 660 degrees around the axis of rotation 1112 defined by the robotic hip 1104 and cause the second robotic leg 1116 to rotate up to 660 degrees around the second axis of rotation 1122 defined by the second robotic hip 1114. In particular, the robotic leg 1106 and the second robotic leg 1116 may rotate with an approximate phase difference of 90 degrees. Thus, the robotic leg 1106 may rotate first followed by the second robotic leg 1116 rotating thereafter.

In some implementations, the robotic system 1100 may cause the robotic leg 1106 up to rotate up to 180 degrees around the axis of rotation 1112 defined by the robotic hip 1104, where the weight of the robotic system 1100 is shifted from being placed on the second robotic foot 1110 to the first robotic foot 1108. In particular, the robotic leg 1106 may rotate in the direction of the circular arrow around the axis of rotation 1112, thereby switching the weight from being placed on the second robotic foot 1110 to the first robotic foot 1108.

Further, the robotic system 1100 may cause the second robotic leg 1116 to rotate up to 180 degrees around the second axis of rotation 1122 defined by the second robotic hip 1114, where the weight of the robotic system is shifted from being placed on the fourth robotic foot 1120 to the third robotic foot 1118. In particular, the second robotic leg 1116 may rotate in the direction of the circular arrow around the axis of rotation 1122, thereby switching the weight from being placed on the fourth robotic foot 1120 to the third robotic foot 1118. Based on causing the robotic leg 1112 and the second robotic leg 1122 to rotate, the robotic system 1100 may take an initial step with the first robotic foot 1108 and a subsequent step with the third robotic foot 1118.

In addition, the robotic system 1100 may include one or more protrusions 1170 and one or more connectors 1180. In the illustrated example, the one or more protrusions 1170 may include four protrusions: a first protrusion 1170A, a second protrusion 1170B, a third protrusion 1170C, and a fourth protrusion 1170D. However, in other examples, the one or more protrusions 1170 may include more or less than four protrusions. The number of protrusions of the one or more protrusions 1170 may be selected in the same or similar way as the number of protrusions of the one or more protrusions 370 and/or the number of protrusions 970.

As shown in FIG. 11, the one or more protrusions 1170 may be connected to the robotic leg 1106 and the second robotic leg 1116 and may extend from the robotic leg 1106 and the second robotic leg 1116 in the similar way as the one or more protrusions 370 are connected to the robotic body 310 and extend from the robotic body 310 and/or the one or more protrusions 970 are connected to the robotic body 310 and extend from the robotic body 310. For instance, the one or more protrusions 1170 may be connected to the robotic leg 1106 and the second robotic leg 1116 by the one or more connectors 1180. In the illustrated example, the one or more connectors 1180 may include four connectors: a first connector 1180A, a second connector 1180B, a third connector 1180C, and a fourth connector 1180D. The one or more connectors 1180 may take the form of or be similar in form to the one or more connectors 380.

Further, as shown in FIG. 11, the first protrusion 1170A may be connected to the second robotic leg 1116 by the first connector 1180A, the second protrusion 1170B may be connected to the second robotic leg 1116 by the second connector 1180B, the third protrusion 11070C may be connected to the robotic leg 1106 by the third connector 1180C, and the fourth protrusion 1170D may be connected to the robotic leg 1106 by the fourth connector 1180D. The one or more protrusions 11070 of FIG. 11 may be similar to the one or more protrusions 370 and the one or more protrusions 970 of FIGS. 3-10 and function in a similar manner.

Figure 12:
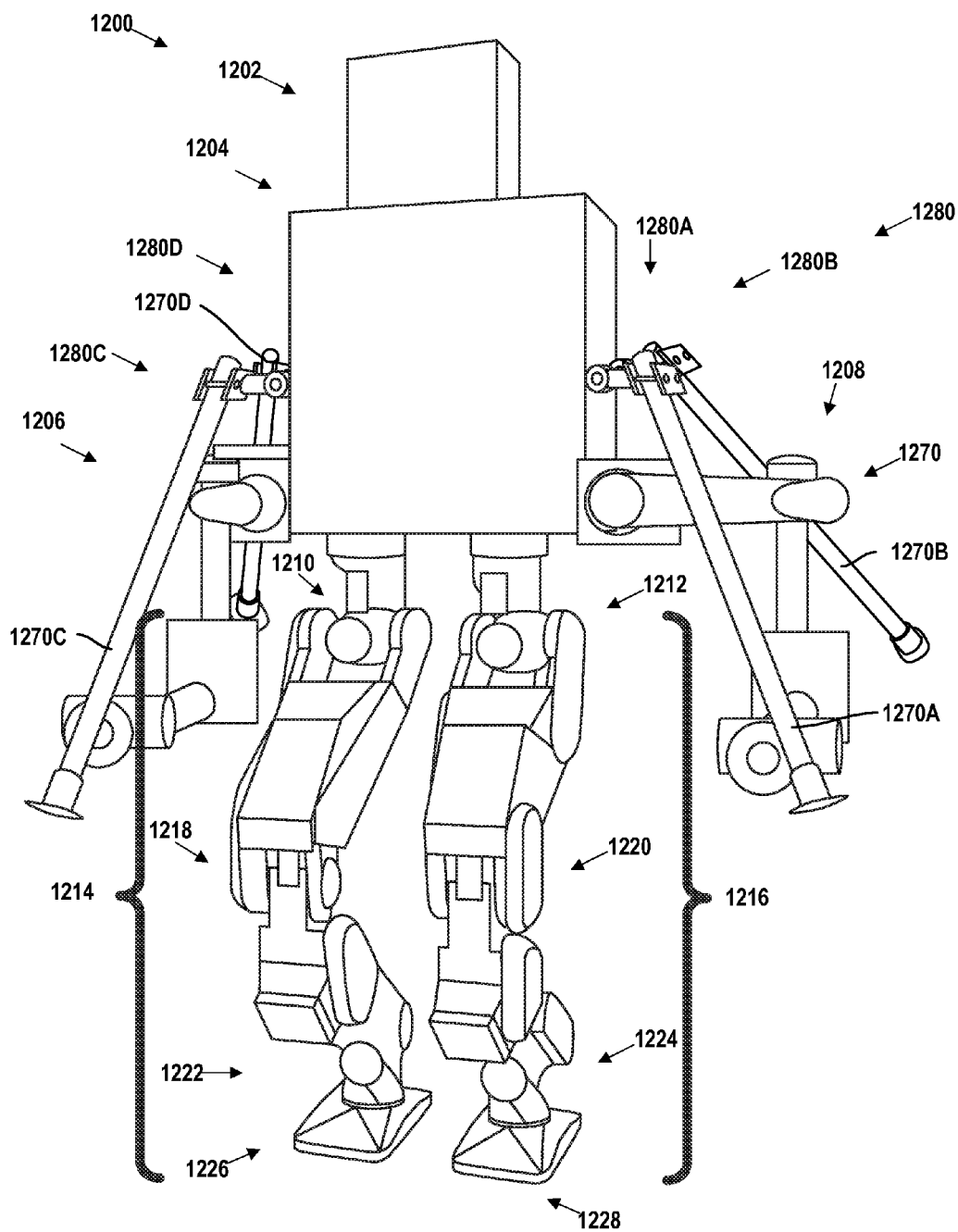
FIG. 12 depicts aspects of a robotic system, according to an example implementation.

FIG. 12 depicts a robotic system, according to an example implementation. The robotic system 1200 may include, for example, one or more parts of the robotic systems described above in relation to FIGS. 1-11. For example, the robotic legs 1214 and 1216 may include sensors 110 such as a sensor that measures inertial forces and/or G-forces in multiple dimensions, a force-torque sensor, a ground force sensor, a friction sensor, and/or a ZMP sensor, among other possibilities. Further, the robotic system 1200 may include one or more motors that generate heat and are cooled by lower temperature liquids around the motors. As such, the robotic system 1200 may engage in bipedal walking.

The robotic system 1200 may include a robotic head 1202, a robotic body 1204, two robotic arms 1206 and 1208, two robotic hips 1210 and 1212, and the two robotic legs 1214 and 1216. Further, the robotic legs 1214 and 1216 may include two robotic knees 1218 and 1220, two robotic ankles 1222 and 1224, and two robotic feet 1226 and 1228, respectively. As such, the robotic system 1200 may be capable of using robotic arms 1206 and 1208 to interact with an environment, possibly beyond the capabilities of the robotic system 300 and/or the robotic system 900.

In addition, the robotic system 1200 may include one or more protrusions 1270 and one or more connectors 1280. In the illustrated example, the one or more protrusions 1270 may include four protrusions: a first protrusion 1270A, a second protrusion 1270B, a third protrusion 1270C, and a fourth protrusion 1270D. Similarly, in the illustrated example, the one or more connectors 1280 may include four connectors: a first connector 1280A, a second connector 1280B, a third connector 1280C, and a fourth connector 1280D.

The one or more protrusions 1270 of FIG. 12 may be similar to the one or more protrusions 370 and one or more protrusions 970 of FIGS. 3-10 and may be of the same configuration and function in a similar manner. In addition, the one or more connectors 1380 of FIG. 13 may be similar to the one or more connectors 380 of FIGS. 3-10 and may be of the same configuration and function in a similar manner.

In some implementations, the one or more protrusions 1270 may be connected to the robotic body 1204, such that the one or more protrusions 1270 may not interfere with a range of motion of the two robotic arms 1206 and 1208.

Figure 13:
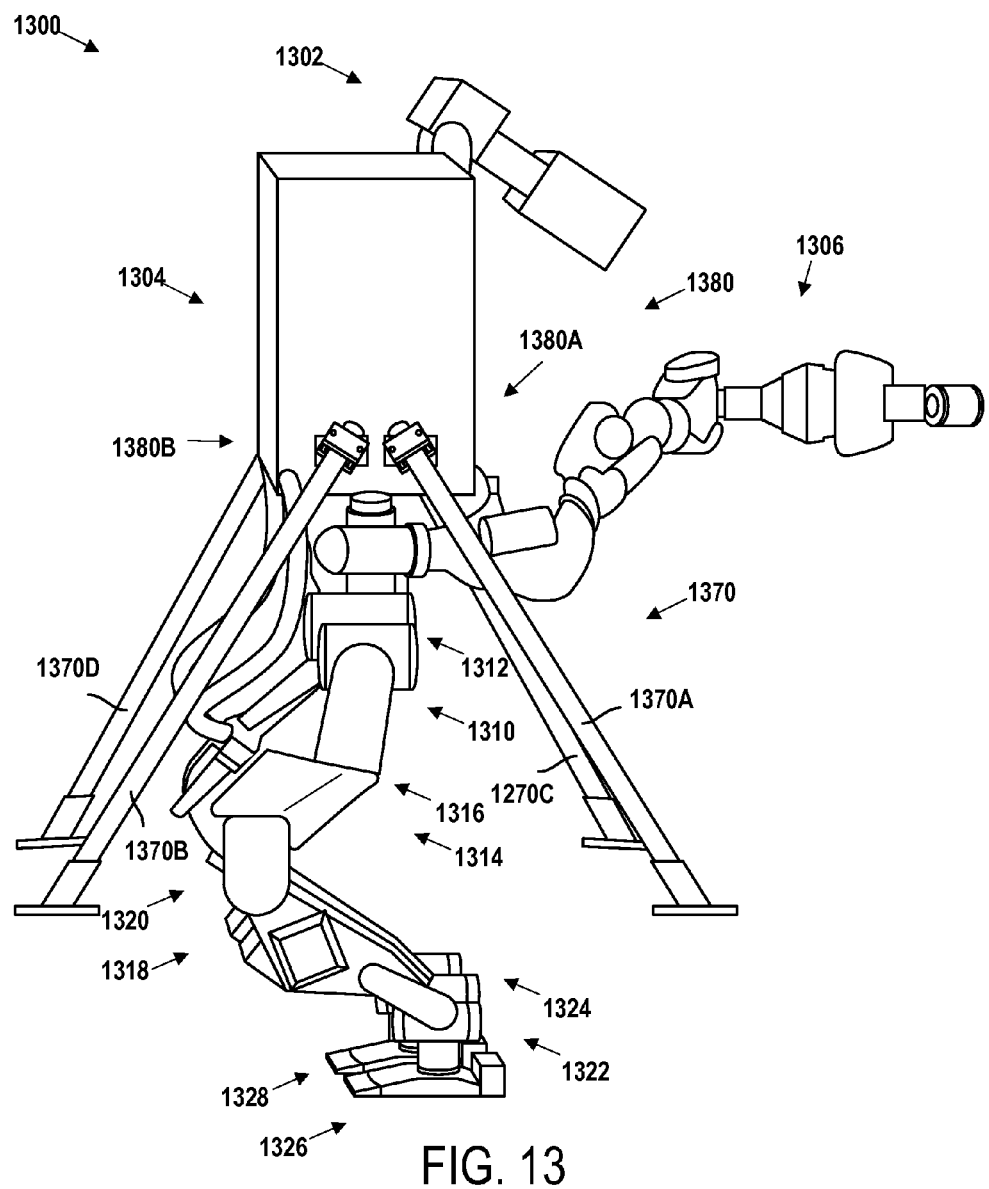
FIG. 13 depicts aspects of a robotic system, according to an example implementation.

FIG. 13 depicts aspects of a robotic system, according to an example implementation. The robotic system 1300 may include, for example, one or more parts of the robotic systems described above in relation to FIGS. 1-12. As shown, FIG. 13 may illustrate a side view of the robotic system 1300. The robotic system 1300 may include a robotic head 1302, a robotic body 1304, a robotic arm 1306, a robotic hip 1310, a second robotic hip 1312, a robotic leg 1314, and a second robotic leg 1316. Further, the robotic legs 1314 and 1316 may include a robotic knee 1318 and a second robotic knee 1320, respectively. Further, the robotic legs 1314 and 1316 may include a robotic ankle 1322 and a second robotic ankle 1324, and a robotic foot 1326 and a second robotic foot 1328, respectively.

In addition, the robotic system 1300 may include one or more protrusions 1370 and one or more connectors 1380. In the illustrated example, the one or more protrusions 1370 may include four protrusions: a first protrusion 1370A, a second protrusion 1370B, a third protrusion 1370C, and a fourth protrusion 1370D. Similarly, in the illustrated example, the one or more connectors 1380 may include four connectors: a first connector 1380A, a second connector 1380B, a third connector 1380C, and a fourth connector 1380D.

The one or more protrusions 1370 of FIG. 13 may be similar to the one or more protrusions 370 and one or more protrusions 970 of FIGS. 3-10 and may be of the same configuration and function in a similar manner. In addition, the one or more connectors 1380 of FIG. 13 may be similar to the one or more connectors 380 of FIGS. 3-10 and may be of the same configuration and function in a similar manner.

In some implementations, the one or more protrusions 1370 may be connected to the robotic body 1304, such that the one or more protrusions 1370 may not interfere with a range of motion of the robotic arm 1306.

In some implementations, the robotic systems described above in relation to FIGS. 1-13 may be used in environments involving natural and human-made disasters. For example, these robotic systems may perform activities in disaster zones to help victims in the vicinity of such disaster zone. In particular, these robotic systems may adapt to various types of sites that the robotic systems may not have previously encountered. As such, these robotic systems may demonstrate some autonomy in making decisions and data obtained from sensors 110. Further, these robotic systems may be controlled remotely based on receiving one or more commands to perform operations.

For example, the robotic systems may travel through areas that may be unsafe for living beings. In particular, these robotic systems may operate in natural disaster areas affected by earthquakes, fires, natural gas leaks, and/or exposures to radioactive elements, among other possible areas. For example, the robotic system 1200 of FIG. 12 may open a door using the robotic arms 1206 and 1208. Further, the robotic arms 1206 and/or 1208 may keep the door open while the robotic legs 1214 and 1216 walk through the doorway. The robotic system 1200 may pick up debris that obstructs pathways, possibly using the robotic arms 1206 and 1208 to move the debris. The robotic system 1200 may cut through walls using one or both of the robotic arms 1206 and/or 1208. For example, the robotic arm 1206 may include a saw that may protrude from the robotic arm 1206 such that the robotic arm 1206 may be directed to cut an opening into a wall. As such, the robotic system 1200 may create escape routes for saving living beings that may be trapped in confined areas.

The robotic systems may operate a diverse assortment of tools, possibly designed to be used by human persons. For example the robotic system 1300 may identify a hose that may be connected to water valve. The robotic system 1300 may carry the hose and connect the hose to the water valve using the robotic arm 1306. Further, the robotic system 1300 may use the robotic arm 1306 to turn a wheel of the valve that allows water to flow through the valve and into the hose. As such, the robotic system 1300 may control the valve and carry the hose to various locations, providing water to such locations.

In some implementations, the robotic systems may be used in various manufacturing facilities. For example, the robotic systems may be used in an assembly line with multiple work stations along the assembly line that add parts to a partially-finished machine. The robotic systems may move parts to various work stations on the assembly line and also from one work station to another. Further, the robotic systems may place parts on the partially-finished machine to facilitate the creation of a finished machine, among other possibilities.

Figure 14:
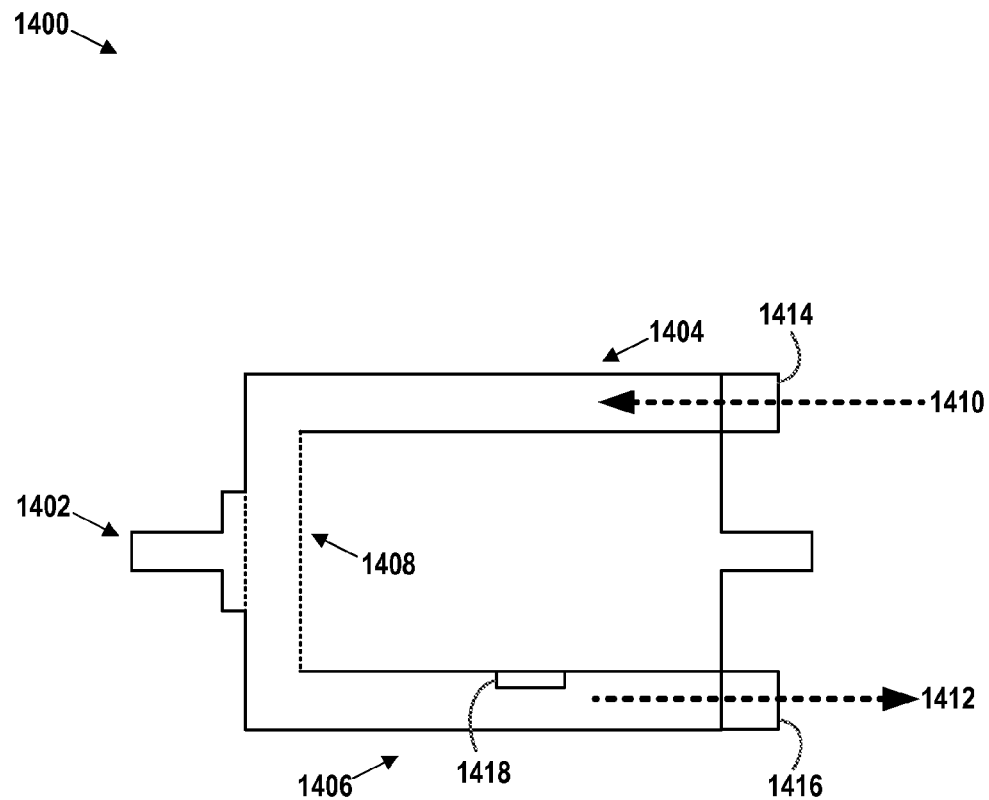
FIG. 14 depicts aspects of a liquid-cooled device, according to an example implementation.

FIG. 14 depicts aspects of a liquid-cooled device 1400, according to an example implementation. The liquid-cooled device 1400 may be incorporated, for example, with the robotic systems as described above in relation to FIGS. 1-13. For example, the liquid-cooled device 1400 may be incorporated with any of the motors described above, such as the motors described above in relation to FIGS. 2 through 13. Further, one or more liquid-cooled devices 1400 may be incorporated in the hips 1104 and 1114 of the robotic system 1100. In particular, the one or more liquid-cooled devices 1400 may include motors to move the robotic hips 1104 and 1114 along robotic legs 1106 and 1116, respectively.

For example, one or more liquid-cooled devices 1400 may be used to move the robotic hip 1104 along the robotic leg 1106 to a first position of the one or more positions between the one end of the robotic leg 1106 and the opposite end of the robotic leg 1106. Further, the one or more liquid-cooled devices 1400 may be used to move the second robotic hip 1114 along the second robotic leg 1116 to a second position of the one or more positions between the one end of the second robotic leg 1116 and the opposite end of the second robotic leg 1116, as described above in relation to FIG. 11. Yet further, the one or more liquid-cooled devices 1400 may include motors that move along the ball screws 1128 and 1130, respectively, as described above in relation to FIG. 11.

As shown, FIG. 14 may illustrate a side view of the liquid-cooled device 1400. The liquid-cooled device 1400 may be a water-cooled device that actively controls the temperature of the motor 1402. For example, the liquid-cooled device 1400 may estimate the internal temperature of the motor 1402 and based on such estimations, the liquid-cooled device 1400 may cool the motor 1402 by passing cooling liquids around the motor 1402. As such, robotic systems with the liquid-cooled device 1400 may be able to create high torque forces using the motor 1402 to move robotic limbs, but also prevent overheating the motor 1402.

The motor 1402 may be a 50-350 Watt brushless motor operable at high speeds. Channels 1404, 1406, and 1408 may make contact with the motor 1402 to absorb, transfer, and/or displace heat (e.g., thermal energy) from the motor 1402, possibly to reduce the temperature of the motor 1402. Further, the channels 1404-1408 may encapsulate the motor 1402, possibly to increase contact with the surface area of the motor 1402. Thus, the channels 1404-1408 may absorb heat produced by the motor 1402 and the surface contact of the channels 1404-1408 with the motor 1402 may cool the motor 1402.

Valves 1414 and 1416 may control liquids flowing in and out of channels 1404 and 1406, respectively. For example, a liquid 1410 may flow into the channel 1404 to cool the motor 1402 and a liquid 1412 may flow out of channel 1406. The liquid 1410 may have a lower temperature than the motor 1402 and the liquid 1412 may have a higher temperature than the liquid 1410. Thus, the channels 1404 and 1406 may be connected by channel 1408 such that the liquid 1410 may flow into channel 1404 through channel 1408 and liquid 1412 may flow out of the channel 1406. In some implementations, there may be a constant flow of liquid 1410 flowing into the channel 1404 and liquid 1412 flowing out of the channel 1406. Further, the liquid 1412 may flow into a reservoir to cool the liquid 1412 such that the liquid 1412 may flow back into channel 1404 to cool the motor 1402. The liquids 1410 and 1412 may also flow in an opposite direction such that liquid 1412 may flow into channel 1406 through channel 1408 and liquid 1410 may flow out of channel 1404.

The temperature of a motor may be difficult to determine. As such, the channel 1406 may include a sensor 1418. The sensor 1418 may include, for example, one or more of the sensors 110 described above in relation to FIG. 1. Thus, the sensor 1418 may determine the temperature of the liquid 1410 to estimate the temperature of the motor 1402. For example, the sensor 1418 may determine that the temperature of the liquid 1412 meets or exceeds a temperature threshold, possibly approximating 90 to 150 degrees Celsius. As such, the valve 1416 may open to release the liquid 1410.

A robotic system may include a driver operable to deliver high current to the motor 1402. By using high power sources to power the driver, the driver may deliver approximately 40-240 Amperes to the motor 1402. Further, the driver may include a copper layer that may also be cooled by channels 1404-1408 of the liquid-cooled device 1400 and the liquids 1410 and 1412. As such, with measures for preventing overheating, the maximum current of the motor 1402 may be approximately 20 times greater than conventional motors. Thus, the drivers enable the motor 1402 to produce larger torque forces in a shortened period of time.

III. Example Methods

Figure 15:
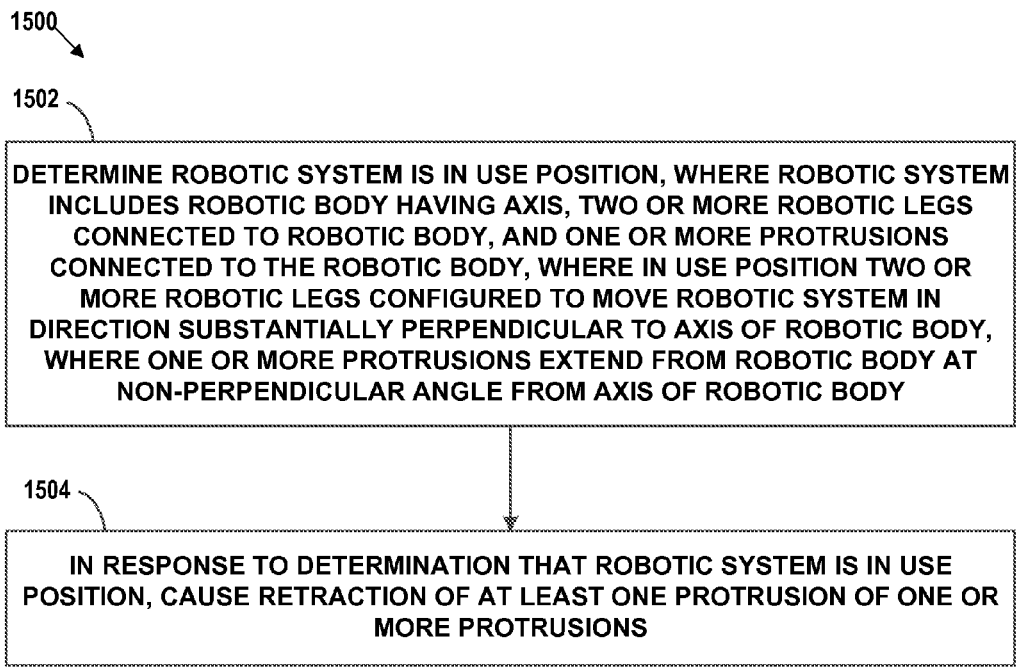
FIG. 15 is a flow chart depicting functions for retracting a protrusion, according to example implementations.

FIG. 15 is a flow chart illustrating a method 1500, according to an example embodiment. The method 1500 may include one or more operations, functions, or actions as illustrated by one or more blocks 1502-1504. Although the blocks are illustrated in sequential order, the blocks may in some instances be performed in parallel. Also, the various blocks may be combined into fewer blocks, divided into additional blocks, and/or removed based upon the desired implementation.

Illustrative methods, such as method 1500, may be carried out in whole or in part by a component or components of a robotic system. For simplicity, method 1600 may be described generally as being carried out by a robotic system, such as the robotic system 900. However, it should be understood that example methods, such as method 1500, may be carried out by other entities or combination of entities without departing from the scope of this disclosure.

At block 1502, the method 1500 may involve determining a robotic system is in the use position. The robotic system includes a robotic body having an axis, two or more robotic legs connected to the robotic body, and one or more protrusions connected to the robotic body, where in the use position the robotic legs are configured to move the robotic system in a direction substantially perpendicular to the axis of the robotic body, and where the one or more protrusions extend from the robotic body at a non-perpendicular axis from the axis of the robotic body.

At block 1504, the method 1500 may involve in response to the determination that the robotic system is in the use position, causing retraction of at least one protrusion of the one or more protrusions.

Figure 16:
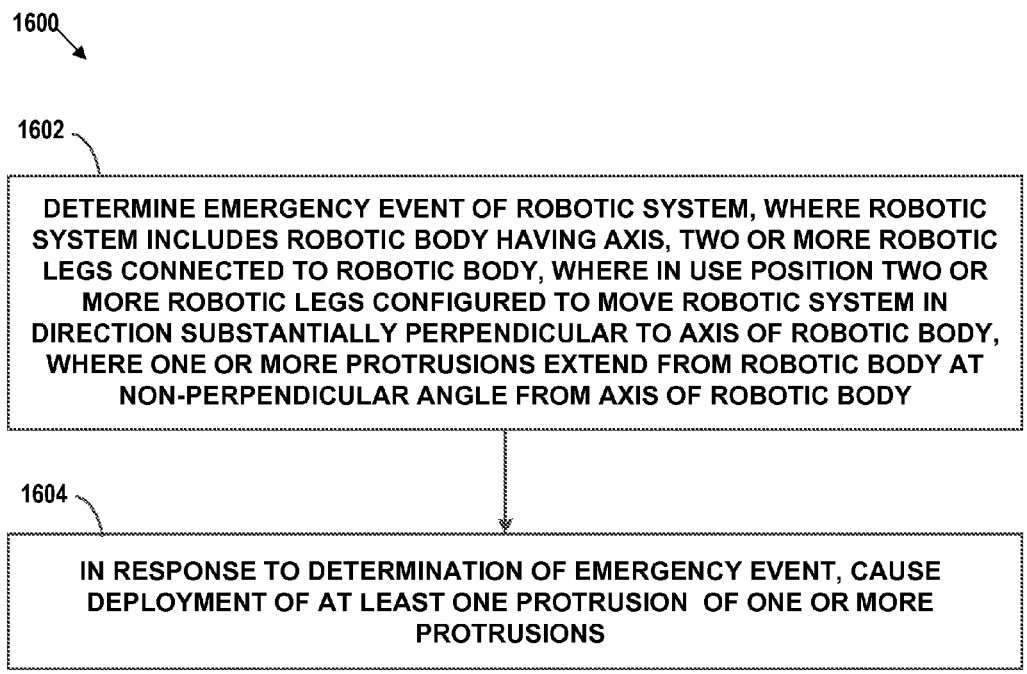
FIG. 16 is a flow chart depicting functions for deploying a protrusion, according to example implementations.

FIG. 16 is a flow chart illustrating a method 1600, according to an example embodiment. The method 1600 may include one or more operations, functions, or actions as illustrated by one or more blocks 1602-1604. Although the blocks are illustrated in sequential order, the blocks may in some instances be performed in parallel. Also, the various blocks may be combined into fewer blocks, divided into additional blocks, and/or removed based upon the desired implementation.

Illustrative methods, such as method 1600, may be carried out in whole or in part by a component or components of a robotic system. For simplicity, method 1600 may be described generally as being carried out by a robotic system, such as the robotic system 900. However, it should be understood that example methods, such as method 1600, may be carried out by other entities or combination of entities without departing from the scope of this disclosure.

At block 1602, the method 1600 may involve determining an emergency event of a robotic system. The robotic system includes a robotic body having an axis, two or more robotic legs connected to the robotic body, and one or more protrusions connected to the robotic body, where in the use position the robotic legs are configured to move the robotic system in a direction substantially perpendicular to the axis of the robotic body, and where the one or more protrusions extend from the robotic body at a non-perpendicular axis from the axis of the robotic body.

At block 1604, the method 1600 may involve in response to the determination of the emergency event of the robotic system, causing deployment of at least one protrusion of the one or more protrusions.

Figure 17:
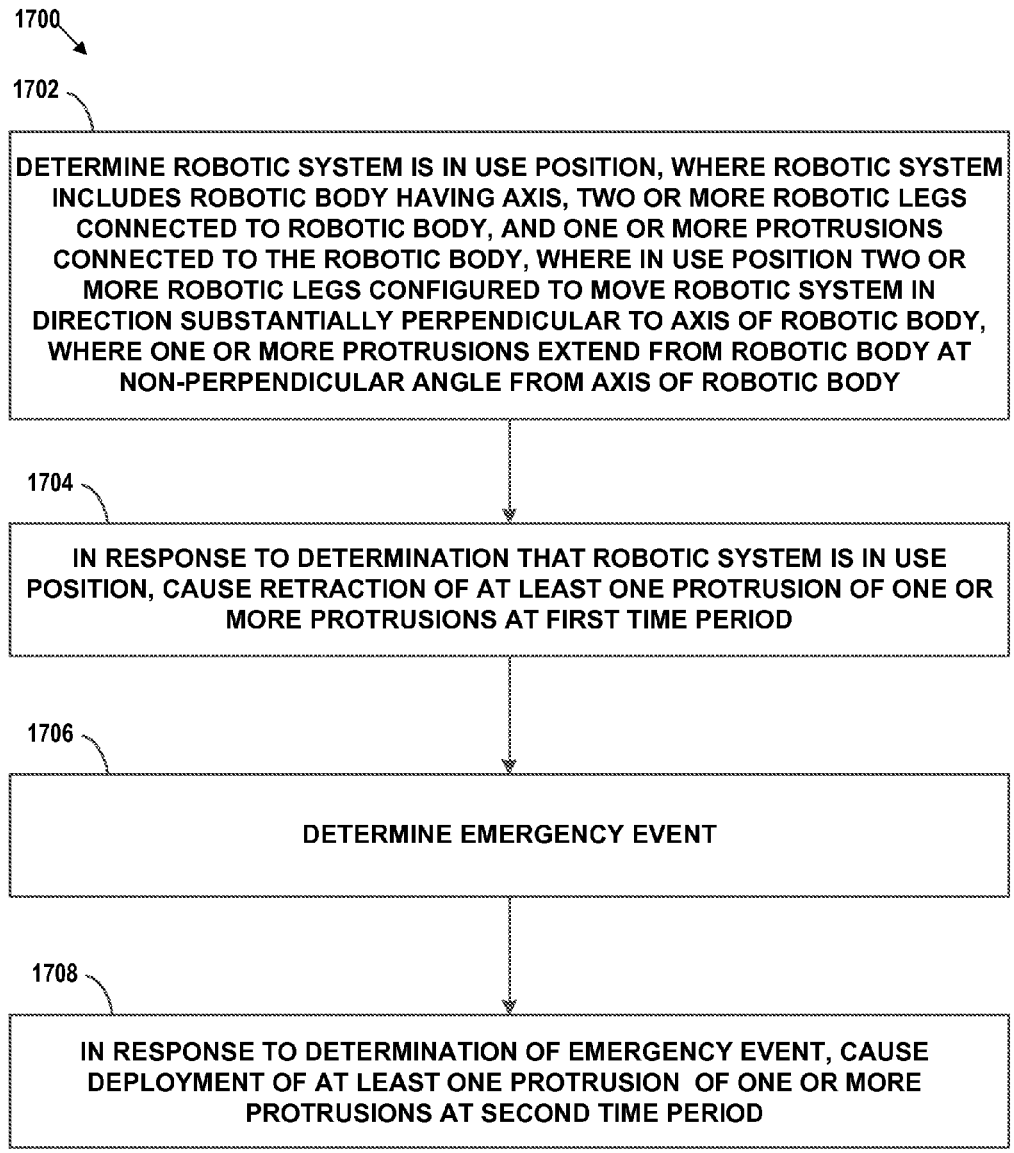
FIG. 17 is a flow chart depicting functions for retracting a protrusion at a first time period and deploying the protrusion at a second time period, according to example implementations.

FIG. 17 is a flow chart illustrating a method 1700, according to an example embodiment. The method 1700 may include one or more operations, functions, or actions as illustrated by one or more blocks 1702-1708. Although the blocks are illustrated in sequential order, the blocks may in some instances be performed in parallel. Also, the various blocks may be combined into fewer blocks, divided into additional blocks, and/or removed based upon the desired implementation.

Illustrative methods, such as method 1700, may be carried out in whole or in part by a component or components of a robotic system. For simplicity, method 1700 may be described generally as being carried out by a robotic system, such as the robotic system 900. However, it should be understood that example methods, such as method 1700, may be carried out by other entities or combination of entities without departing from the scope of this disclosure.

At block 1702, the method 1700 may involve determining a robotic system is in the use position. The robotic system includes a robotic body having an axis, two or more robotic legs connected to the robotic body, and one or more protrusions connected to the robotic body, where in the use position the robotic legs are configured to move the robotic system in a direction substantially perpendicular to the axis of the robotic body, and where the one or more protrusions extend from the robotic body at a non-perpendicular axis from the axis of the robotic body.

At block 1704, the method 1700 may involve in response to the determination that the robotic system is in the use position, causing refraction of at least on protrusion of the one or more protrusions at a first time period.

At block 1706, the method 1700 may involve may involve determining an emergency event. In some examples, the emergency event may be a high acceleration of the robotic system and/or an impending crash of the robotic system.

At block 1708, the method 1700 may involve in response to determining of the emergency event, causing deployment of the at least one protrusion of the one or more protrusions at a second time period.

IV. Example Robotic Systems

Figure 18:
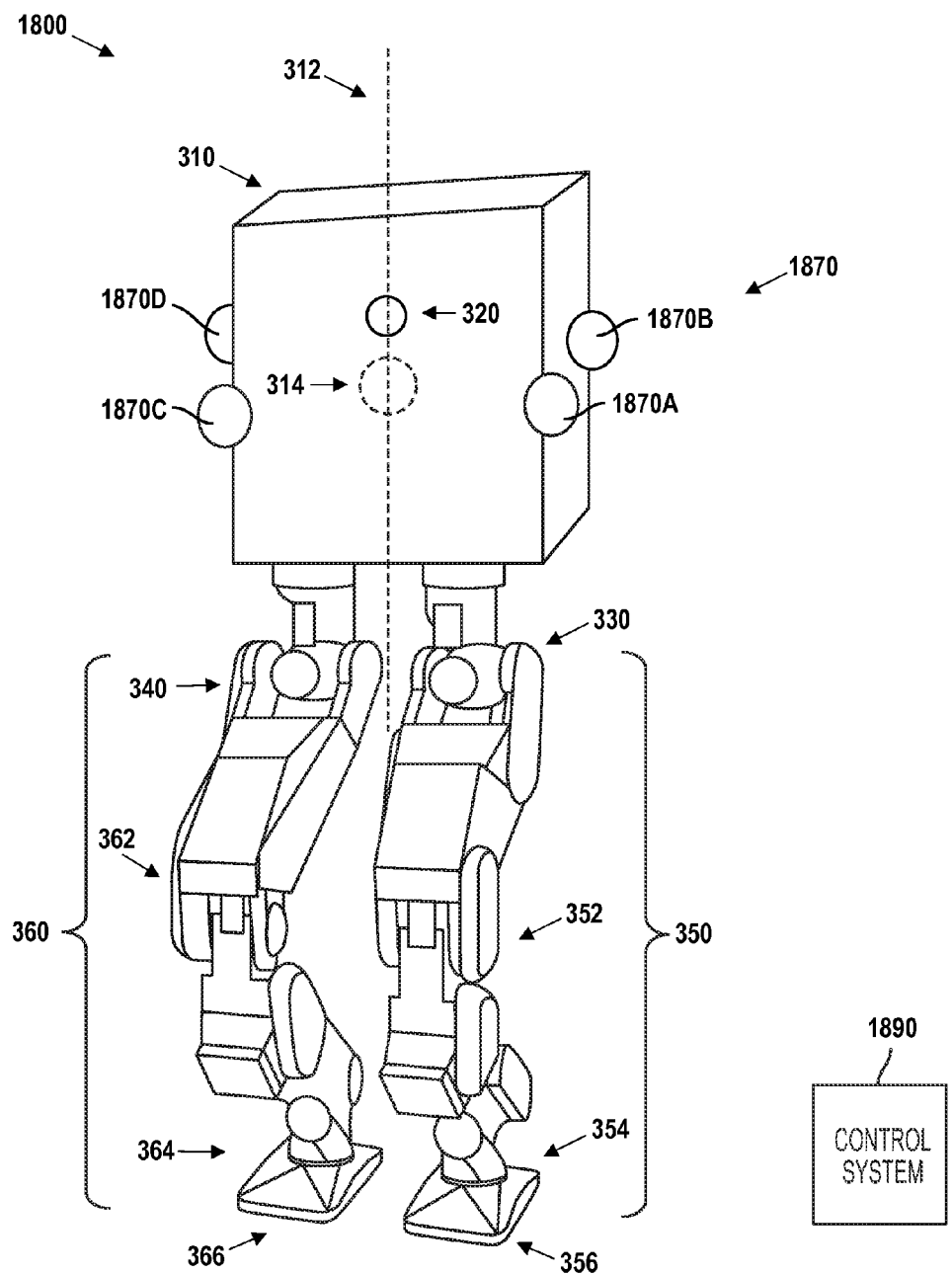
FIG. 18 depicts aspects of a robotic system, according to an example implementation.

FIG. 18 depicts aspects of a robotic system, according to an example implementation. The robotic system 1800 may include one or more parts of the robotic systems described above in relation to FIGS. 1 and 2 in the same or similar way as the robotic system 300 and/or the robotic system 900 includes one or more parts of the robotic systems described above in relation to FIGS. 1 and 2. For example, the robotic legs 350 and 360 may include actuators 108 and sensors 110 such as a sensor that measures inertial forces and or G-forces in multiple dimensions, a force-torque sensor, a ground force sensor, a friction sensor, and/or a ZMP sensor, among other possibilities. Further, the robotic system 1800 may include one or more motors that generate heat and are cooled by lower temperature liquids around the motors. As such, the robotic system 1800 may engage in bipedal walking.

The robotic system 1800 may include the robotic body 310, the sensor 320 connected to the robotic body 310, the two robotic hips 330 and 340 connecting the robotic body 310 to the two robotic legs 350 and 360, one or more air bags 1870, and a control system 1890. The robotic body 310 may include the axis 312 and may have the center of mass 314.

In the illustrated example, the one or more air bags 1870 may include four air bags: a first air bag 1870A, a second air bag 1870B, a third air bag 1870C, and a fourth air bag 1870D. However, in other examples, the one or more air bags 1870 may include more or less than four air bags. The number of air bags of the one or more air bags 1870 may be selected based on one or more parameters of the robotic system 1800 and/or an environment in which the robotic system 1800 operates. For example, the number of air bags of the one or more air bags 1870 may be selected based on the G-force of the robotic system 1800, a predetermined speed or acceleration of the robotic system 1800 in the use position, dimensions of the environment, terrain of the environment, or a number of obstacles in the environment.

The first air bag 1870A may include an envelope (or cushion) that may be configured to inflate with a gas, such as air. The first air bag 1870A may take various different forms in various different embodiments. For instance, the first air bag 1870A may be constructed of any suitable material. Further, the first air bag 1870A may have various sizes and thicknesses. Yet further, the first air bag 1870A may have various cross-section shapes, such as circular, elliptical, square, a square with rounded corners, rectangular, a rectangle with rounded corners, and/or triangular. In some implementations, the first air bag 1870A may have one cross-section shape. However, in some implementations, the first air bag 1870A may have one or more portions with different cross-section shapes. Any portion of the first air bag 1870A may have any of the cross-section shapes described herein.

In an example, the second air bag 1870B, the third air bag 1870C, and the fourth air bag 1870D may each take the form of or be similar in form to the first air bag 1870A. Moreover, in some examples, each air bag of the one or more air bags 1870 may include the same or similar material, size, thickness, cross-section shape, etc. However, in other examples, at least one air bag of the one or more air bags 1870 may include a different material, size, thickness, cross-section shape, etc.

In some implementations, the material, size, thickness, and/or the cross-section shape of the one or more air bags 1870 may be selected based on one or more parameters of the robotic system 1800 and/or the environment in which the robotic system 1800 operates. For example, the material, size, thickness, and/or the cross-section shape of the one or more air bags 1870 may be selected based on the G-force of the robotic system 1800, a predetermined speed or acceleration of the robotic system 1800 in the use position, the dimensions of the environment, the terrain of the environment, the number of obstacles in the environment, and/or the temperature of the environment.

As shown in FIG. 18, the one or more air bags 1870 may be connected to the robotic body 310. Further, in some embodiments, the one or more air bags 1870 may located around the center of mass 314 of the robotic body 310.

Moreover, the one or more air bags 1870 may be located outside of the scanning area 322 of the sensor 320. With this arrangement, the one or more air bags 1870 may not interfere with the sensor 320 receiving information within the scanning area 322. For instance, in some embodiments, the scanning area 322 may be located between the first air bag 1870A and the third air bag 1870C.

The one or more air bags 1870 may be connected to the robotic body 310 by any suitable connection. For instance, in some implementations, the one or more air bags 1870 may be detachably connected to the robotic body 310. With this arrangement, the one or more air bags 1870 may be connected to the robotic body 310 after other components of the robotic system 1800 (e.g., robotic body 310 and two robotic legs 350 and 360) have been assembled or manufactured. In addition, detachably connecting the one or more air bags 1870 to the robotic body 310 may reduce a time period to replace or repair at least one air bag of the one or more air bags 1870. Moreover, in some implementations, the one or more air bags 1870 may be directly connected to the robotic body 310. Further, in some implementations, the one or more air bags 1870 may be indirectly connected to the robotic body 310 by one or more other components.

In some examples, each air bag of the one or more air bags 1870 may be connected in the same way to the robotic body 310. However, in other examples, at least one air bag may be connected differently. For instance, a first air bag (e.g., the first air bag 1870A) may be directly connected to the robotic body 310 and a second air bag (e.g., the second air bag 1870B) may be indirectly connected to the robotic body 310.

Although the one or more air bags 1870 in the robotic system 1800 have been described above as connected to the robotic body 310, in other examples, at least one air bag of the one or more air bags 1870 may be connected to other components of the robotic system 1800, such as the robotic hip 330, the robotic hip 340, the robotic leg 350, and/or the robotic leg 360. The at least one air bag of the one or more air bags 1870 may be connected to the other components of the robotic system 1800 in the same or similar way as the one or more air bags 1870 are connected to the robotic body 310.

In addition, the one or more air bags 1870 may be configured to deploy. With this arrangement, the one or more air bags 1870 may be actively controlled.

In some implementations, the control system 1890 may be configured to perform one or more functions described herein. The control system 1890 may take the form of or be similar in form to the control system 990.

Figure 19A:
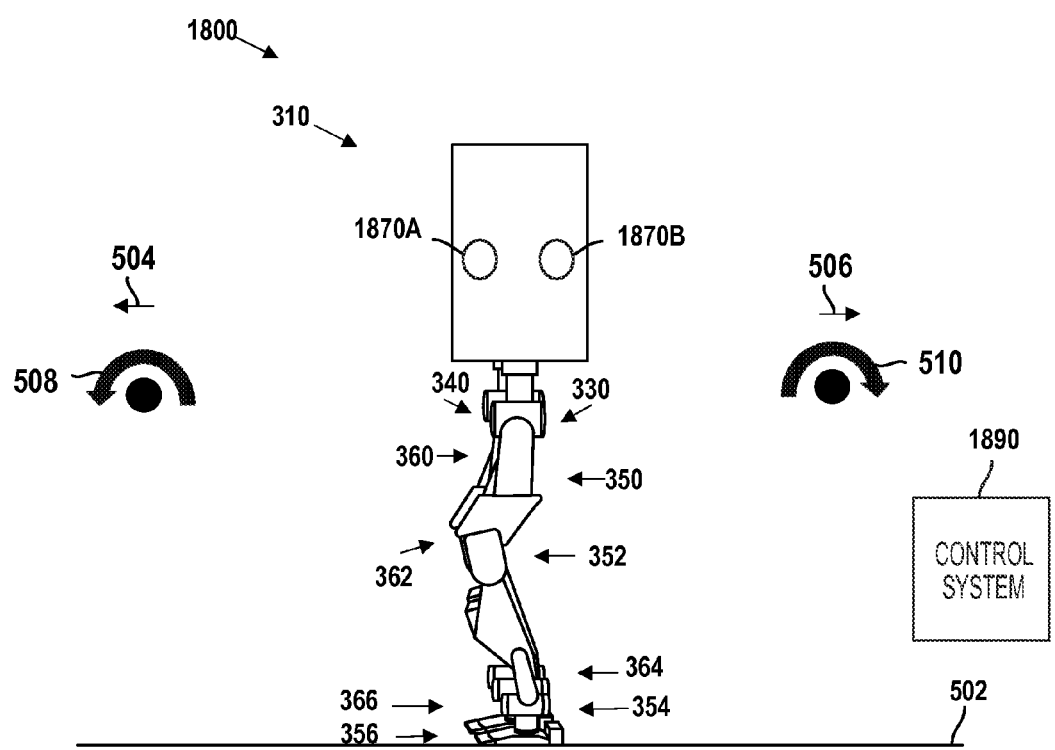
FIG. 19A depicts aspects of a robotic system in a starting position, according to an example implementation.

FIG. 19A depicts aspects of the robotic system 1800 in the starting position, according to an example embodiment. In particular, FIG. 19A illustrates a side view of the robotic body 310, the two robotic legs 350 and 360, the first air bag 1870A and the second air bag 1870B. In the starting position, the two robotic feet 356 and 366 may contact the ground 502 in the same or similar way as the two robotic feet 356 and 366 of the robotic system 300 and/or the two robotic feet 356 and 366 of the robotic system 900. Further, in the starting position, the two robotic legs 350 and 360 may be oriented in the same or similar way as the two robotic legs 350 and 360 of the robotic system 300 and/or the two robotic legs 350 and 360 of the robotic system 900. In addition, in the illustrated example, the robotic system 1800 may be oriented in the direction 504.

Figure 19B:
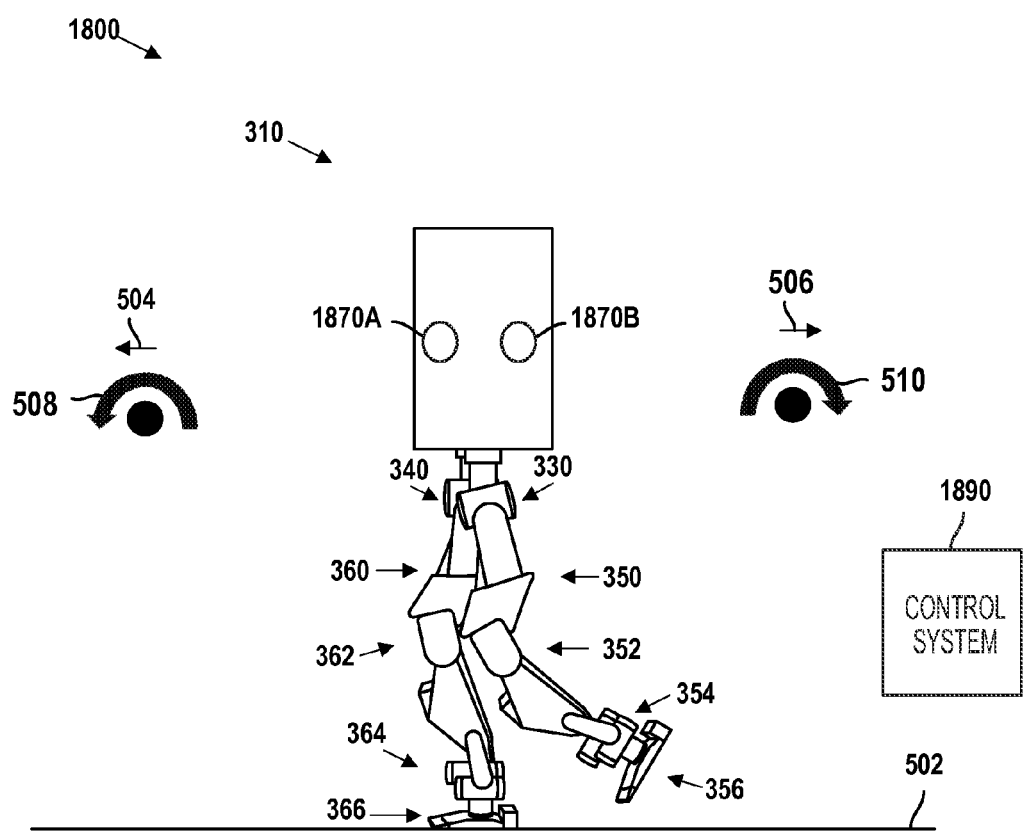
FIG. 19B depicts aspects of a robotic system in a use position, according to an example implementation.

FIG. 19B depicts aspects of the robotic system 1800 in the use position, according to an example implementation. In particular, FIG. 19B illustrates a side view of the robotic body 310, the two robotic legs 350 and 360, the first air bag 1870A, and the second air bag 1870B. In the use position, the two robotic feet 356 and 366 may contact the ground 502 in the same or similar way as the two robotic feet 356 and 366 of the robotic system 300 and/or the two robotic feet 356 and 366 of the robotic system 900. Further, in the use position, the two robotic legs 350 and 360 may swing forward to take a step in the same or similar way as the two robotic legs 350 and 360 of the robotic system 300 and/or the two robotic legs 350 and 360 of the robotic system 900. In addition, in the illustrated example, the robotic system 1800 may move in a direction substantially parallel to the direction 504.

The one or more air bags 1870 may be configured to receive an external force when the robotic system 1800 falls toward the ground 502, crashes into an obstacle in the environment in which the robotic system 1800 operates, or otherwise fails. In some embodiments, the robotic system 1800 may fall toward the ground from the starting position or otherwise fail in the starting position. Moreover, in some embodiments, in the use position, the robotic system 1800 may fall toward the ground, crash into an obstacle in the environment, or otherwise fail. Further, in some embodiments, in the use position the one or more air bags 1870 may be configured to receive an external force.

For example, when the robotic system 1800 falls towards the ground in a direction substantially parallel to the direction 504, the first air bag 1870A and/or the third air bag 1870C (not shown) may receive the external force. As another example, when the robotic system 1800 falls towards the ground in the direction 506, the second air bag 1870B and/or the fourth air bag 1870D (not shown) may receive the external force. As another example, when the robotic system 300 falls towards the ground in the direction 508, the first air bag 1870A and/or the second protrusion may receive the external force. And as another example, when the robotic system 1800 falls toward the ground in the direction 510, the third air bag 1870C and/or the second end of the fourth air bag 1870D may receive the external force. Further, when the robotic system 300 crashes into an obstacle in the environment or otherwise fails, some or all of the one or more air bags 1870 may receive the external force.

In some implementations, the one or more air bags 1870 may be configured to withstand receiving the external force when the robotic system 1800 falls towards the ground 502, crashes into an obstacle in the environment, or otherwise fails. With this arrangement, the one or more air bags 1870 that received the external force may not be replaced or repaired after the robotic system 1800 falls toward the ground 502, crashes into an obstacle in the environment, or otherwise fails.

Further, in some implementations, the one or more air bags 1870 may be configured to fail in response to receiving the external force when the robotic system 1800 falls towards the ground 502, crashes into an obstacle in the environment, or otherwise fails. The one or more air bags 1870 may fail in response to receiving the external force in a variety of ways. For example, the one or more protrusions 1870 may deform, bend, break, and/or rupture in response to receiving the external force. With this arrangement, when the one or more air bags 1870 fails in response to receiving the external force, the one or more air bags 1870 may be replaced or repaired after the robotic system 1800 falls towards the ground 502, crashes into an obstacle in the environment, or otherwise fails.

When the one or more air bags 1870 receive an external force when the robotic system 1800 falls towards the ground 502, crashes into an obstacle in the environment, or otherwise fails, other components of the robotic system 1800 (e.g., robotic body 310, two robotic hips 330 and 340, two robotic legs 350 and 360, two robotic knees 352 and 362, and/or two robotic ankles 354 and 364) may not receive the external force. With this arrangement, in starting position and/or the use position, the one or more air bags 1870 may help to reduce mechanical damage to the other components of the robotic system 1800.

Beneficially, replacing or repairing a failed air bag of the one or more air bags 1870 may be less expensive than replacing or repairing other components of the robotic system 1800 that are mechanically damaged by the robotic system 1800 falling towards the ground 502, crashing into an obstacle in the environment, or otherwise failing. In addition, the time period to replace or repair the failed air bag may be less than the time period to replace or repair other components of the robotic system 1800 that are mechanically damaged by the robotic system 1800 falling towards the ground 502, crashing into an obstacle in the environment, or otherwise failing.

Further, some or all of the one or more air bags 1870 may be deployed. In some examples, deployment of the one or more air bags 1870 may involve filling the one or more air bags 1870 with a gas, such as air. And in at least one such example, deployment of the one or more air bags 1870 may involve triggering the one or more air bags 1870 to fill with a gas. Deployment of some or all of the one or more air bags 1870 may help the deployed air bags receive the external force when the robotic system 1800 falls towards the ground 502, crashes into an obstacle in an environment in which the robotic system 1800 operates, or otherwise fails. Accordingly, deployment of some or all of the one or more air bags 1870 may reduce mechanical damage of other components of the robotic system 1800 (e.g., robotic body 310, two robotic hips 330 and 340, two robotic legs 350 and 360, two robotic knees 352 and 362, and/or two robotic ankles 354 and 364) when the robotic system 1800 falls towards the ground 502, crashes into an obstacle in an environment in which the robotic system 1800 operates, or otherwise fails.

In some implementations, the control system 1890 may be configured to (i) make a determination of an emergency event and (ii) in response to the determination of the emergency event, deploy some or all of the air bags of the one or more air bags 1870. The control system may receive data from the sensors 110 and the determination of the emergency event may be based at least in part on the data received from the sensors 110. In addition, the control system 1890 may be configured to detect an acceleration of the robotic system 1800 and the determination of the emergency event is based at least in part on the acceleration of the robotic system 1800. The control system 1890 may receive data from the sensors 110 to detect the acceleration of the robotic system 1800. Moreover, the control system 1890 may be configured to detect an impending crash of the robotic system 1800 and the determination of the emergency event may be based at least in part on the impending crash of the robotic system 1800. The control system 1890 may receive data from the sensors 110 to detect the impending crash of the robotic system 1800.

In addition, in some implementations, the control system 1890 may be configured to (i) make a determination of an emergency event and (ii) in response to the determination of the emergency event, cause deployment of some or all of the protrusions of the one or more air bags 1870.

Further, in some implementations, some or all of the one or more air bags 1870 may be deployed at substantially the same time. For instance, some or all of the one or more air bags 1870 may be deployed at the same time or a deviation from the same that does not cause the robotic system 1800 to operate in a significantly different manner from when some or all of the one or more air bags 1870 are deployed at the same time. As one example, the control system 1890 may deploy the first air bag 1870A and the second air bag 1870B at a first time period. As another example, the control system 1890 may cause deployment of the first air bag 1870A and the second air bag 1870B at a first time period.

Moreover, in some implementations, at least one air bag of the one or more air bags 1870 may be deployed at a different time period. As one example, the control system 1890 may deploy the first air bag 1870A at a first time period and the control system 1890 may deploy the second air bag 1870B at a second time period. As another example, the control system 1890 may cause deployment of the first air bag 1870A at a first time period and the control system 1890 may cause deployment of the second air bag 1870B at a second time period.

In some implementations, the robotic system 1800 may include a non-transitory computer-readable medium that stores program instructions executable by one or more processors, such as the processor 106 of the robotic system 100 described above in relation to FIG. 1. The program instructions may cause the robotic system 1800 to perform operations. The operations may include determining an emergency event. Further, the operations may include in response to the determination of the emergency event, causing deployment of at least one air bag of the one or more air bags 1870.

Although the one or more air bags 1870 have been described above as being included in the robotic system 1800, the one or more air bags 1870 may be included in other robotic systems as well. For instance, the one or more air bags 1870 may be included in robotic systems that include components from the robotic system 1100, components from the robotic system 1200, and/or components from the robotic system 1300. In addition, the one or more air bags 1870 may be included in robotic systems that include the one or more protrusions 370, the second protrusion 770, and/or the one or more protrusions 970.

In some implementations, the robotic systems described above in relation to FIG. 18-20 may be used in environments involving natural and human-made disasters in the same or similar way as the robotic systems described above in relation to FIGS. 1-13.

Further, the liquid-cooled device 1400 may be incorporated, for example, with the robotic systems described above in relation to FIGS. 18-20.

V. Example Methods

Figure 20:
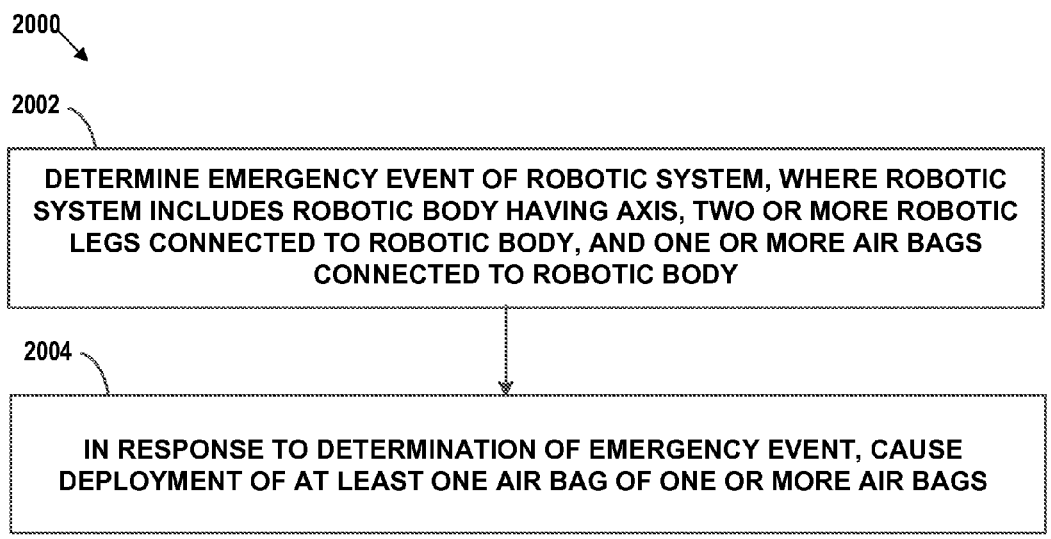
FIG. 20 depicts functions for deploying an air bag, according to example implementations.

FIG. 20 is a flow chart illustrating a method 2000, according to an example embodiment. The method 2000 may include one or more operations, functions, or actions as illustrated by one or more blocks 2002-2004. Although the blocks are illustrated in sequential order, the blocks may in some instances be performed in parallel. Also, the various blocks may be combined into fewer blocks, divided into additional blocks, and/or removed based upon the desired implementation.

Illustrative methods, such as method 2000, may be carried out in whole or in part by a component or components of a robotic system. For simplicity, method 2000 may be described generally as being carried out by a robotic system, such as the robotic system 1800. However, it should be understood that example methods, such as method 2000, may be carried out by other entities or combination of entities without departing from the scope of this disclosure.

At block 2002, the method 2000 may involve determining an emergency event of a robotic system. The robotic system includes a robotic body having an axis, two or more robotic legs connected to the robotic body, and one or more air bags connected to the robotic body. In some examples, the emergency event may be a high acceleration of the robotic system and/or an impending crash of the robotic system.

At block 2004, the method 2000 may involve in response to determining the emergency event, causing deployment of the at least one air bag of the one or more air bags.

VI. Conclusion

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A robotic system comprising:
a robotic body having an axis;
a sensor connected to the robotic body, wherein the sensor is configured to receive information within a scanning area;
two or more robotic legs connected to the robotic body, wherein the two or more robotic legs are configured to operate in a starting position and a use position, wherein in the starting position the robotic system is substantially stationary, and wherein in the use position the two or more robotic legs are configured to move the robotic system in a direction substantially perpendicular to the axis of the robotic body;
one or more protrusions connected to the robotic body, wherein the one or more protrusions extend from the robotic body at a non-perpendicular angle from the axis of the robotic body and are located outside of the scanning area of the sensor, and wherein in the starting position the one or more protrusions are configured to support the robotic system; and
a control system, wherein the control system is configured to (i) make a determination that the robotic system is in the use position and (ii) in response to the determination that the robotic system is in the use position, retract at least one protrusion of the one or more protrusions.

2. The robotic system of claim 1, wherein the robotic body comprises a center of mass, and wherein the one or more protrusions radially extend from the center of mass.

3. The robotic system of claim 1, wherein the one or more protrusions comprise four protrusions.

4. The robotic system of claim 1, wherein at least one protrusion of the one or more protrusions is detachably connected to the robotic body.

5. The robotic system of claim 1, wherein at least one protrusion of the one or more protrusions comprises a first end and a second end, wherein the first end is connected to the robotic body, wherein the first end is located at a first elevation, and wherein the second end is located at a second elevation that is less than the first elevation.

6. The robotic system of claim 1, further comprising one or more second protrusions connected to the robotic body wherein the one or more second protrusions extend from the robotic body at a non-perpendicular angle from the axis of the robotic body and are located outside of the scanning area of the sensor, wherein at least one protrusion of the one or more second protrusions comprises a first end and a second end, wherein the first end is connected to the robotic body, wherein the first end is located at a first elevation, and wherein the second end is located at a second elevation that is greater than the first elevation.

7. The robotic system of claim 1, wherein at least one protrusion of the one or more protrusions comprises a compliant material.

8. The robotic system of claim 1, wherein at least one protrusion of the one or more protrusions comprises a first end and a second end, wherein the first end is connected to the robotic body, and wherein in the use position the second end is configured to receive an external force.

9. The robotic system of claim 1, wherein at least one protrusion of the one or more protrusions comprises a rod and a spring, wherein the rod has a first end and a second end, and wherein the spring is connected to the robotic body and the first end of the rod.

10. The robotic system of claim 9, wherein in the use position the second end of the rod is configured to receive an external force, and wherein in the use position the spring is configured to deform in response to the second end of the rod receiving the external force.

11. The robotic system of claim 1, wherein in the use position at least one protrusion of the one or more protrusions is further configured to retract.

12. The robotic system of claim 1, wherein the one or more protrusions comprises two or more protrusions, and wherein in the use position a first protrusion of the two or more protrusions is further configured to retract at a first time period, and wherein in the use position a second protrusion of the two or more protrusions is further configured to retract at a second time period.

13. The robotic system of claim 1, wherein in the use position at least one protrusion of the one or more protrusions is further configured to retract at a first time period and deploy at a second time period.

14. The robotic system of claim 1, wherein the one or more protrusions comprises two or more protrusions, and wherein in the use position a first protrusion of the one or more protrusions is further configured to retract at a first time period and deploy and at a second time period, and wherein in the use position a second protrusion of the one or more protrusions is further configured to retract a third time period and deploy at a fourth time period.

15. The robotic system of claim 1, wherein in the use position the control system is configured (i) make a determination of an emergency event and (ii) in response to the determination of the emergency event, deploy at least one protrusion of the one or more protrusions.

16. The robotic system of claim 15, wherein the control system is further configured to detect an acceleration of the robotic system, and wherein the determination of the emergency event is based at least in part on the acceleration of the robotic system.

17. The robotic system of claim 15, wherein the control system is further configured to detect an impending crash of the robotic system, and wherein the determination of the emergency event is based at least in part on the impending crash of the robotic system.

18. A robotic system comprising:
one or more processors;
a robotic body having an axis;
a sensor connected to the robotic body, wherein the sensor is configured to receive information within a scanning area;
two or more robotic legs connected to the robotic body, wherein the two or more robotic legs are configured to operate in a starting position and a use position, wherein in the starting position the robotic system is substantially stationary, and wherein in the use position the two or more robotic legs are configured to move the robotic system in a direction substantially perpendicular to the axis of the robotic body;
one or more protrusions connected to the robotic body, wherein the one or more protrusions extend from the robotic body at a non-perpendicular angle from the axis and are located outside of the scanning area of the sensor, and wherein in the starting position the one or more protrusions are configured to support the robotic system; and
a computer-readable medium having stored thereon program instructions that, when executed by the one or more processors, cause the robotic system to perform operations comprising:
determining the robotic system is in the use position,
in response to the determination that the robotic system is in the use position, causing retraction of at least one protrusion of the one or more protrusions at a first time period,
determining an emergency event, and
in response to the determination of the emergency event, causing deployment of the at least one protrusion at a second time period.

19. A method comprising:
determining a robotic system is in a use position, wherein the robotic system comprises: a robotic body having an axis, two or more robotic legs connected to the robotic body, and one or more protrusions connected to the robotic body, wherein in the use position the two or more robotic legs are configured to move the robotic system in a direction substantially perpendicular to the axis of the robotic body, and wherein the one or more protrusions extend from the robotic body at a non-perpendicular angle from the axis of the robotic body;
in response to determining the robotic system is in the use position, causing retraction of at least one protrusion of the one or more protrusions at a first time period;
determining an emergency event; and
in response to determining the emergency event, causing deployment of the at least one protrusion at a second time period.

* * * * *